(12) United States Patent
Owechko et al.

(10) Patent No.: US 8,891,820 B2
(45) Date of Patent: Nov. 18, 2014

(54) MULTI-MODAL SENSOR FUSION

(75) Inventors: Yuri Owechko, Newbury Park, CA (US); Shinko Y. Cheng, Campbell, CA (US); Swarup S. Medasani, Newbury Park, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 202 days.

(21) Appl. No.: 13/249,064

(22) Filed: Sep. 29, 2011

(65) Prior Publication Data

US 2013/0083959 A1   Apr. 4, 2013

(51) Int. Cl.
| | | |
|---|---|---|
| *G06K 9/00* | (2006.01) | |
| *G06K 9/32* | (2006.01) | |
| *G06T 7/00* | (2006.01) | |
| *G06T 7/20* | (2006.01) | |

(52) U.S. Cl.
CPC ... *G06K 9/00771* (2013.01); *G06T 2207/10016* (2013.01); *G06T 7/0028* (2013.01); *G06T 7/0032* (2013.01); *G06T 2207/20076* (2013.01); *G06T 2207/10044* (2013.01); *G06T 2207/10032* (2013.01); *G06T 7/208* (2013.01); *G06T 2207/10048* (2013.01)
USPC .......................................... 382/103; 382/294

(58) Field of Classification Search
USPC ............................... 382/128, 294; 38/128, 294
See application file for complete search history.

(56) References Cited

U.S. PATENT DOCUMENTS

| | | | |
|---|---|---|---|
| 6,072,496 A * | 6/2000 | Guenter et al. | 345/419 |
| 8,098,888 B1 * | 1/2012 | Mummareddy et al. | 382/103 |
| 8,401,276 B1 * | 3/2013 | Choe et al. | 382/154 |
| 2003/0218674 A1 * | 11/2003 | Zhao et al. | 348/140 |
| 2007/0052803 A1 * | 3/2007 | Chosak et al. | 348/143 |
| 2009/0135191 A1 * | 5/2009 | Azar et al. | 345/522 |
| 2011/0169625 A1 * | 7/2011 | James et al. | 340/439 |
| 2012/0304085 A1 | 11/2012 | Kim et al. | |
| 2013/0034266 A1 * | 2/2013 | Shamir et al. | 382/103 |

FOREIGN PATENT DOCUMENTS

WO   WO 2011101856 A2 *   8/2011

OTHER PUBLICATIONS

Isard et al., "Condensation—Conditional Density Propagation for Visual Tracking," International Journal of Computer Vision, May 28, 1998, pp. 5-28, vol. 29, No. 1, Kluwer Academic Publishers, The Netherlands.
Nguyen et al., "Spatio-Temporal Context for Robust Multitarget Tracking," IEEE Transactions on Pattern Analysis and Machine Intelligence, Jan. 2007, pp. 1-13, vol. 29, No. 1, IEEE Computer Society.
O'Hern et al., "Baseline Tracker (Brat)", The Air Force Research Laboratory ("AFRL"), Nov. 2009, pp. 1-50.
U.S. Appl. No. 13/113,295, filed May 23, 2011, Kyungnam et al.

* cited by examiner

*Primary Examiner* — Matthew Bella
*Assistant Examiner* — Weiwen Yang
(74) *Attorney, Agent, or Firm* — Yee & Associates

(57) ABSTRACT

A method and apparatus for processing images. A sequence of images for a scene is received from an imaging system. An object in the scene is detected using the sequence of images. A viewpoint of the imaging system is registered to a model of the scene using a region in the model of the scene in which an expected behavior of the object is expected to occur.

20 Claims, 15 Drawing Sheets

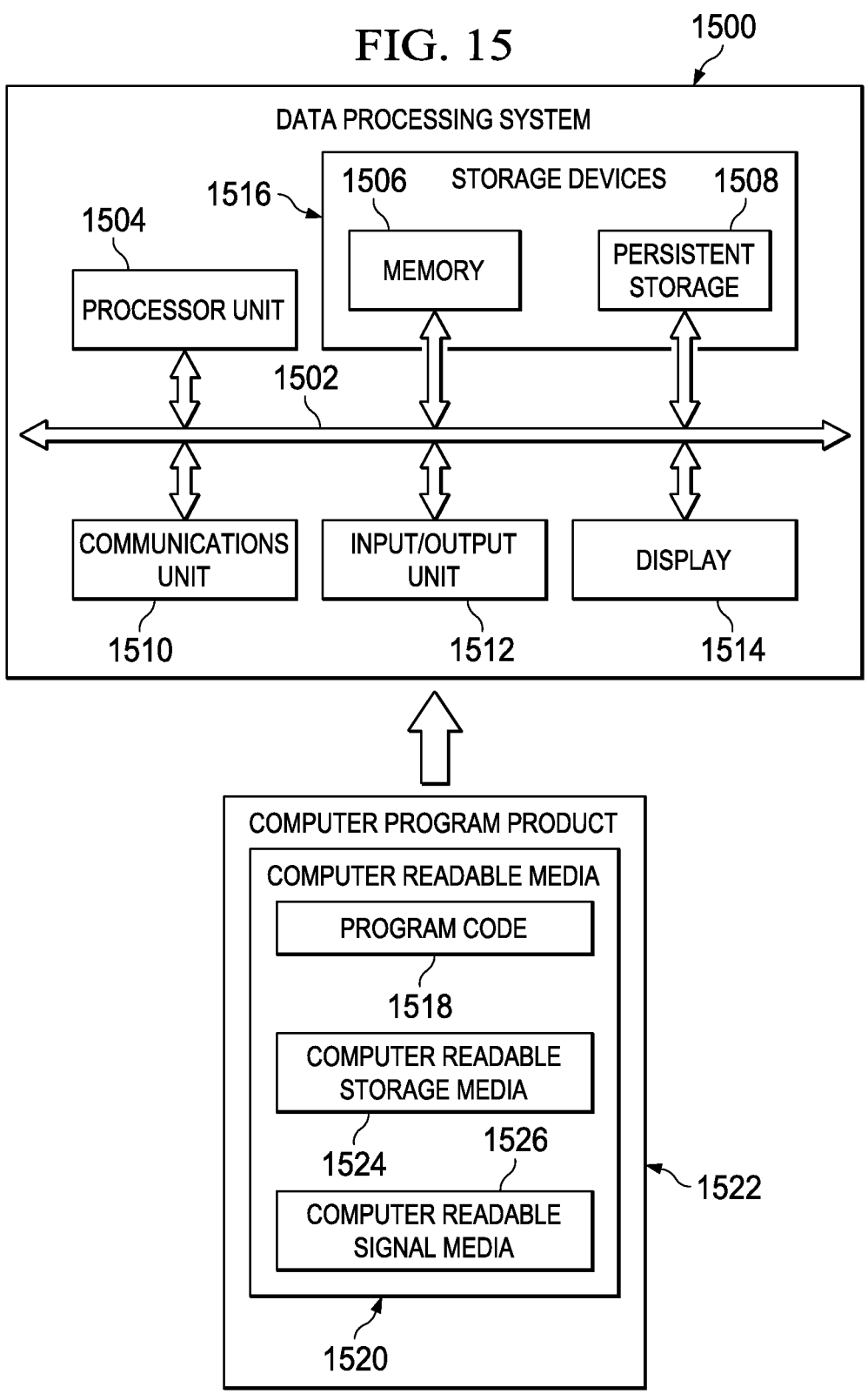

MULTI-MODAL SENSOR FUSION

BACKGROUND INFORMATION

1. Field

The present disclosure relates generally to processing different types of sensor data. Still more particularly, the present disclosure relates to a method and apparatus for registering different types of sensor data to a common model.

2. Background

Information about a scene may be identified using different types of sensor data. A scene may be any physical area for which sensor data can be generated. For example, without limitation, a scene may be an area in a city, a neighborhood, an area in a forest, an underwater region, a region of airspace, an area in a manufacturing facility, a room, a surface of a structure, or some other suitable type of scene.

The different types of sensor data that may be generated for a scene include, but are not limited to, acoustic data, biometric data, imaging data, voltage readings, vibration data, and other suitable types of sensor data. These different types of sensor data may be used in performing operations, such as, for example, without limitation, detecting the presence of objects in the scene, identifying the objects in the scene, tracking the movement of objects in the scene, detecting changes in an environment of the scene, measuring distances between objects in the scene, and other suitable operations.

As one illustrative example, different types of imaging data may be used for detecting, identifying, and/or tracking objects in a scene. The different types of imaging data may include, for example, without limitation, electro-optical (EO) images, infrared (IR) images, thermal images, radar images, ultraviolet images, and other suitable types of imaging data.

Oftentimes, sensor data generated from multiple sources may be combined such that the resulting information may be more accurate, more complete, and/or more reliable as compared to the sensor data generated by a single source. The process of combining the sensor data from the different sources may be referred to as "sensor fusion." In particular, when the different sources are of the same modality, the process may be referred to as "uni-modal sensor fusion." Further, when the different sources are of different modalities, the process may be referred to as "multi-modal sensor fusion."

As one illustrative example of multi-modal sensor fusion, electro-optical images for a scene may be combined with infrared images for the same scene to generate overall information for the scene. This overall information may be used to track objects in the scene more accurately as compared to using only one of these types of images.

Oftentimes, performing sensor fusion for sensor data generated by different types of sources includes matching features between the different types of sensor data. For example, with currently-available systems for performing sensor fusion for two different types of images, features identified from the two different types of images may be matched. For example, features may be matched based on the features identified in the two different types of images having similar colors, brightness, shapes, and/or textures.

The identification of features in images is typically based on pixel values in the images. As a result, the accuracy of sensor fusion may depend on factors, such as, for example, sensor response, lighting, viewpoint of the sensor system, type of image, and/or other suitable factors. For example, matching features identified in two different types of images that are generated from different viewpoints may be more difficult than desired.

Therefore, it would be advantageous to have a method and apparatus that takes into account at least some of the issues discussed above, as well as possibly other issues.

SUMMARY

In one illustrative embodiment, a method for processing images is provided. A sequence of images for a scene is received from an imaging system. An object in the scene is detected using the sequence of images. A viewpoint of the imaging system is registered to a model of the scene using a region in the model of the scene in which an expected behavior of the object is expected to occur.

In another illustrative embodiment, an apparatus comprises a computer system. The computer system is configured to receive a sequence of images for a scene from an imaging system. The computer system is further configured to detect an object in the scene using the sequence of images. The computer system is further configured to register a viewpoint of the imaging system to a model of the scene using a region in the model of the scene in which an expected behavior of the object is expected to occur.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 15 is an illustration of a data processing system in accordance with an illustrative embodiment.

DETAILED DESCRIPTION

The different illustrative embodiments recognize and take into account many different considerations. For example, the different illustrative embodiments recognize and take into account that currently-available systems for performing sensor fusion with different types of imaging data are primarily based on finding matches between features identified in the different types of imaging data. These features are typically identified based on pixel values.

Further, the different illustrative embodiments recognize and take into account that some currently-available systems may take into account the position of objects in an image relative to other objects in the image to register the image to a model. However, the different illustrative embodiments recognize and take into account that these currently-available systems do not take into account the behaviors of moving objects with respect to the scene in which these objects are present.

The different illustrative embodiments recognize and take into account that it may be desirable to have a system for combining the imaging data generated by different types of imaging systems that does not rely solely on the values of pixels in the imaging data. In particular, the different illustrative embodiments recognize and take into account that it may be desirable to have a system for registering the imaging data generated by different types of imaging systems to a model that is more accurate than currently-available systems.

Figure 1:
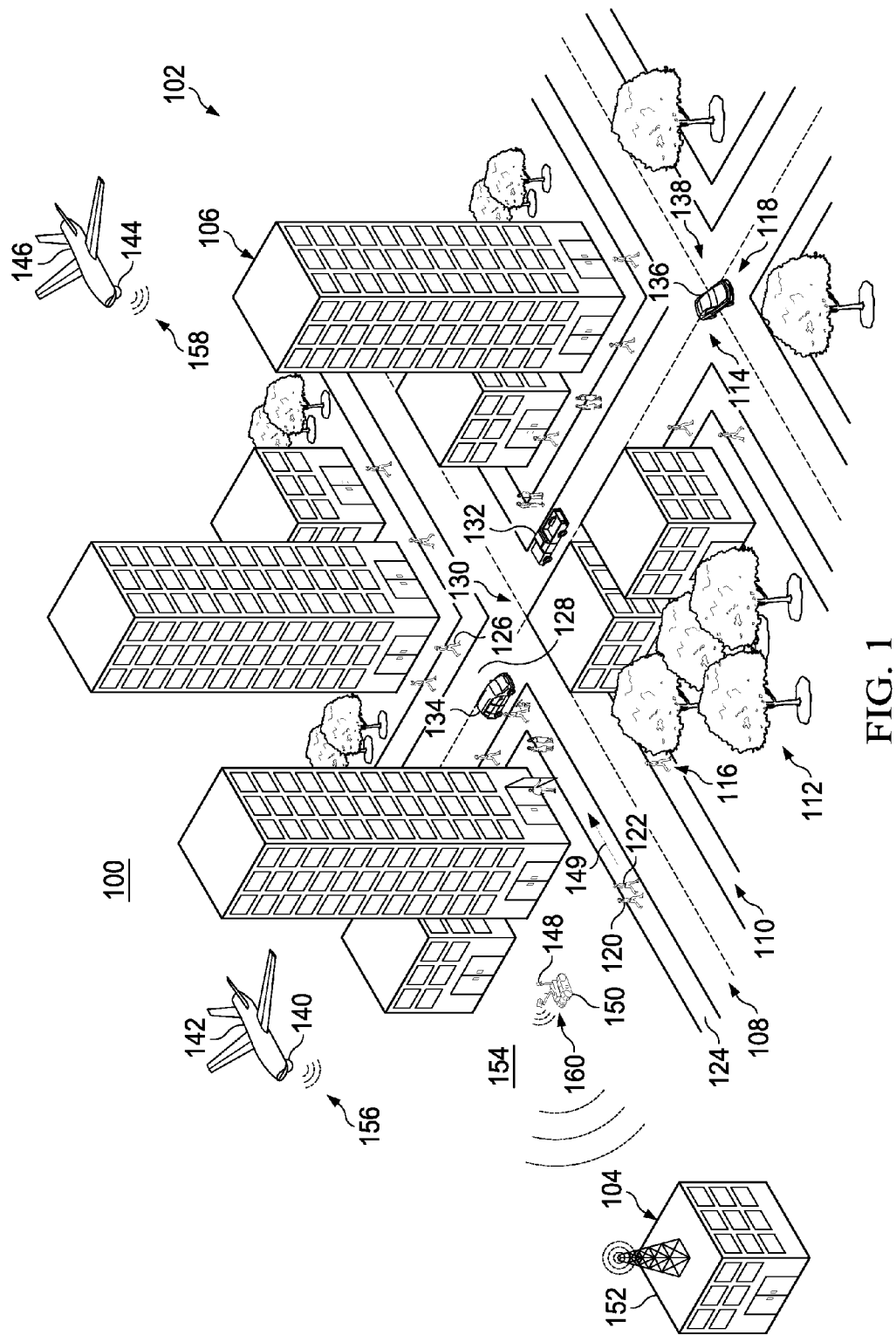
FIG. 1 is an illustration of an environment in which information about a scene is processed in accordance with an illustrative embodiment.

With reference now to the figures and, in particular, with reference to FIG. 1, an illustration of an environment in which information about a scene is processed is depicted in accordance with an illustrative embodiment. Environment 100 includes scene 102 and data processing system 104 that is configured to collect sensor data about scene 102. In this illustrative example, scene 102 is an area of a city.

Scene 102 includes buildings 106, roads 108, sidewalks 110, trees 112, intersections 114, pedestrians 116, and vehicles 118. As depicted, pedestrians 116 are walking along sidewalks 110, crossing roads 108 at intersections 114, and entering and exiting buildings 106. For example, pedestrian 120 and pedestrian 122 are walking on sidewalk 124. Pedestrian 126 is crossing road 128 at intersection 130. Further, vehicles 118 are traveling along roads 108 and turning at intersections 114. For example, vehicle 132 and vehicle 134 are traveling along road 128 in opposite directions. Vehicle 136 is turning at intersection 138.

In this illustrative example, data processing system 104 includes imaging system 140 on unmanned aerial vehicle 142, imaging system 144 on unmanned aerial vehicle 146, imaging system 148 on robotic ground vehicle 150, and control station 152. Imaging systems 140, 144, and 148 are configured to collect sensor data in the form of imaging data for scene 102. In particular, these imaging systems are configured to generate images of scene 102.

As depicted, imaging system 140 on unmanned aerial vehicle 142 and imaging system 144 on unmanned aerial vehicle 146 are configured to generate images of scene 102 while unmanned aerial vehicle 142 and unmanned aerial vehicle 146 fly over scene 102. Further, imaging system 148 on robotic ground vehicle 150 is configured to generate images of scene 102 while robotic ground vehicle 150 moves on ground 154 of scene 102. In this manner, different types of images of scene 102 may be collected from different viewpoints.

In this illustrative example, imaging systems 140, 144, and 148 have different modalities. In other words, these imaging systems generate different types of images using different types of sensors. For example, imaging system 140 may generate electro-optical (EO) images using electro-optical sensors. Imaging system 144 may generate infrared (IR) images using infrared sensors. Imaging system 148 may generate thermal images using thermographic sensors.

Additionally, imaging systems 140, 144, and 148 also may be configured to send these images to control station 152 for processing. For example, imaging systems 140, 144, and 148 may send images to control station 152 using wireless communications links 156, 158, and 160, respectively.

Control station 152 may use these images to detect, identify, and/or track objects in scene 102, such as, for example, without limitation, pedestrians 116 and/or vehicles 118 in scene 102. In one illustrative example, these images may be used in performing surveillance of scene 102. In another illustrative example, these images may be used to monitor the activity of pedestrians 116 entering and exiting buildings 106.

The different illustrative embodiments recognize and take into account that objects in scene 102 may be detected in the images generated by each of imaging systems 140, 144, and 148. Further, the different illustrative embodiments recognize and take into account that combining the detections of objects in the different types of images generated by imaging systems 140, 144, and 148 may allow the movement of these objects to be more accurately and efficiently tracked in scene 102 as compared to using the images generated by one of these imaging systems alone. For example, as depicted, the movement of pedestrian 120 along path 149 may be tracked using the imaging data generated by imaging systems 140, 144, and 148.

Additionally, the different illustrative embodiments also recognize and take into account that combining the images generated by imaging systems 140, 144, and 148 may include combining the detections of objects in the different types of images. In other words, the images may be combined using sensor fusion.

However, the different illustrative embodiments recognize and take into account that typically, detections of objects in images are made using features identified based on pixel values in the images. As a result, the sensor fusion of the images generated by imaging systems 140, 144, and 148 may be affected by the different viewpoints of these imaging systems at the time the images were generated, the lighting in scene 102, the modality of these imaging systems, and/or other suitable factors.

Further, the different illustrative embodiments recognize and take into account that it may be desirable to have a system that performs sensor fusion by registering the viewpoints of the different types of imaging systems to a common model. The common model may be, for example, a two-dimensional map, a three-dimensional model of a scene, or some other suitable type of model. In particular, the different illustrative embodiments recognize and take into account that it may be desirable to have a system that registers the viewpoints of these different types of imaging systems to the common model without relying on the detections of objects in the images at the pixel level.

Thus, the different illustrative embodiments provide a method and apparatus for processing images. In one illustrative embodiment, a sequence of images for a scene is received from an imaging system. An object is detected in the scene using the sequence of images. A viewpoint of the imaging system is registered to a model of the scene using a region in the model of the scene in which an expected behavior of the object is expected to occur.

Figure 2:
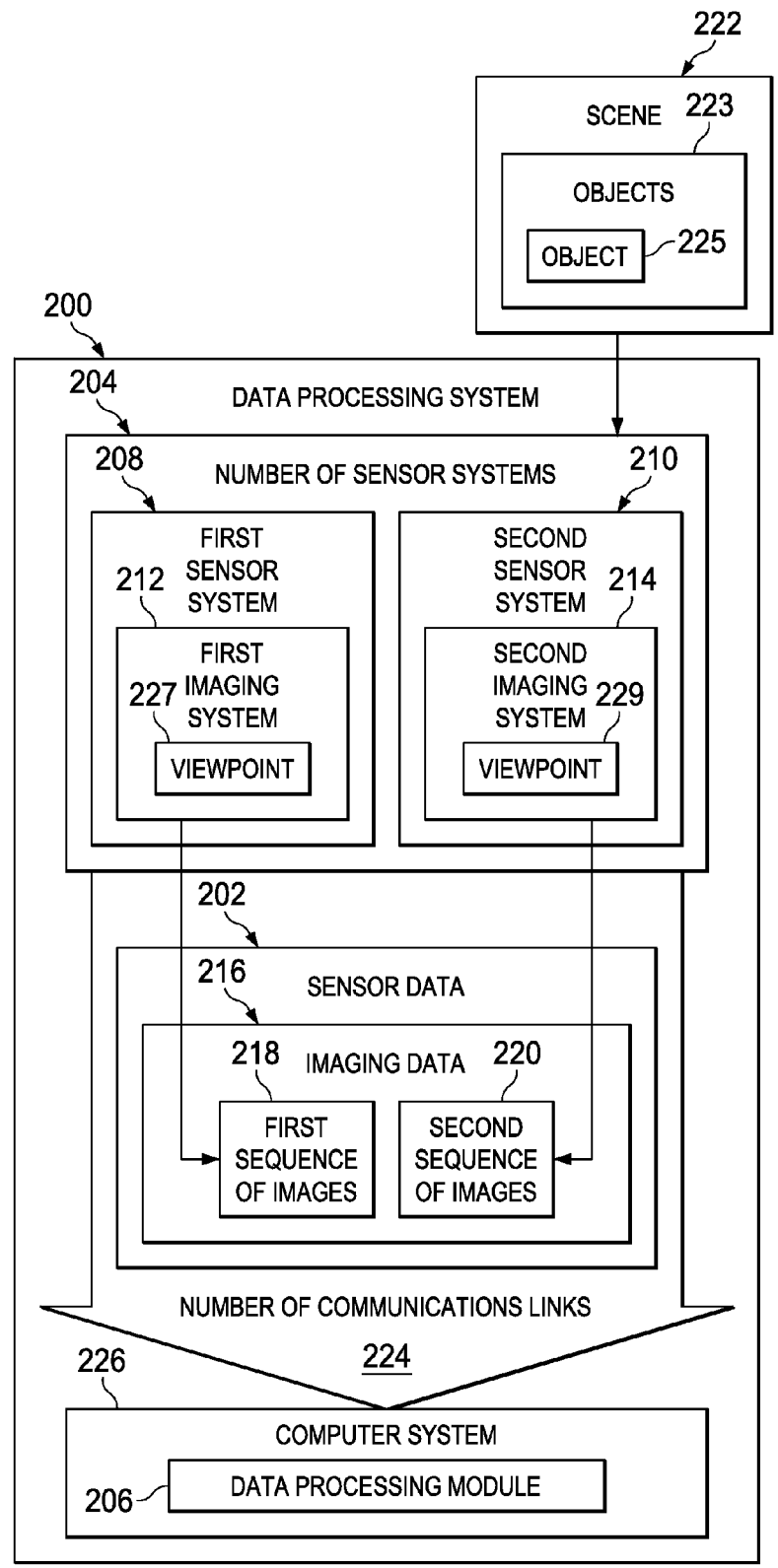
FIG. 2 is an illustration of a data processing system in accordance with an illustrative embodiment.

With reference now to FIG. 2, an illustration of a data processing system is depicted in accordance with an illustrative embodiment. Data processing system 200 is configured to generate and process sensor data 202. In these illustrative examples, data processing system 200 includes number of sensor systems 204 and data processing module 206. Number of sensor systems 204 is configured to generate sensor data 202, while data processing module 206 is configured to process sensor data 202.

As used herein, a "number of items" means one or more items. In this manner, a "number of sensor systems" means one or more sensor systems. In these illustrative examples, number of sensor systems 204 may include first sensor system 208 and second sensor system 210. In one illustrative example, first sensor system 208 takes the form of first imaging system 212, and second sensor system 210 takes the form of second imaging system 214.

First imaging system 212 and second imaging system 214 generate sensor data 202 in the form of imaging data 216. In these illustrative examples, first imaging system 212 and second imaging system 214 may generate imaging data 216 in one or more modalities.

For example, each of first imaging system 212 and second imaging system 214 may be selected from at least one of an electro-optical (EO) imaging system, an infrared (IR) imaging system, a radar imaging system, a thermal imaging system, an ultrasound imaging system, a light detection and ranging (LIDAR) system, and some other suitable type of imaging system. In this manner, imaging data 216 generated by each of first imaging system 212 and second imaging system 214 may comprise images selected from at least one of electro-optical images, infrared images, radar images, thermal images, light detection and ranging images, and other suitable types of images. Electro-optical images may be, for example, visible light images.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, first imaging system 212 generates first sequence of images 218, while second imaging system 214 generates second sequence of images 220. As used herein, a "sequence of images" is two or more images generated in a consecutive order with respect to time. First sequence of images 218 and second sequence of images 220 may be generated for scene 222. In some illustrative examples, each of first sequence of images 218 and second sequence of images 220 may be referred to as video of scene 222.

Scene 222 may be a physical area, such as, for example, without limitation, an area of a city, a neighborhood, an area over an ocean, an area in a forest, an area in a desert, a town, a geographical area, an area inside a manufacturing facility, a floor in a building, a section of highway, or some other suitable type of area. Scene 102 in FIG. 1 is an example of one implementation for scene 222.

Objects 223 may be present in scene 222. Object 225 is an example of one of objects 223 in scene 222. Object 225 may take the form of, for example, without limitation, a person, a vehicle, a mobile structure, a package, and/or some other suitable type of object. A vehicle in scene 222 may take the form of, for example, without limitation, a car, a truck, an aircraft, a van, a tank, an unmanned aerial vehicle, a spaceship, a missile, a rocket, or some other suitable type of vehicle.

In these depicted examples, first imaging system 212 generates first sequence of images 218 from viewpoint 227 of scene 222. Second imaging system 214 generates second sequence of images 220 from viewpoint 229 of scene 222. Viewpoint 227 and viewpoint 229 may change over time, depending on the implementation. For example, if first imaging system 212 is attached to a platform, such as an unmanned aerial vehicle (UAV), viewpoint 227 of first imaging system 212 may change as the unmanned aerial vehicle flies over scene 222.

In these illustrative examples, number of sensor systems 204 is configured to send sensor data 202 to data processing module 206 using number of communications links 224. Number of communications links 224 may include at least one of, for example, a wired communications link, a wireless communications link, an optical communications link, and other suitable types of communications links.

Data processing module 206 may be implemented using hardware, software, or a combination of both. In these illustrative examples, data processing module 206 may be implemented in computer system 226. Computer system 226 may comprise a number of computers. When more than one computer is present in computer system 226, these computers may be in communication with each other.

In these illustrative examples, data processing module 206 is configured to process sensor data 202 received from number of sensor systems 204. In particular, when more than one sensor system is present in number of sensor systems 204, data processing module 206 may be configured to combine sensor data 202 generated by the different sensor systems to provide more accurate and complete data as compared to sensor data 202 generated by one of number of sensor systems 204. In other words, data processing module 206 may perform sensor fusion. Data processing module 206 is described in more detail in FIG. 3 below.

Figure 3:
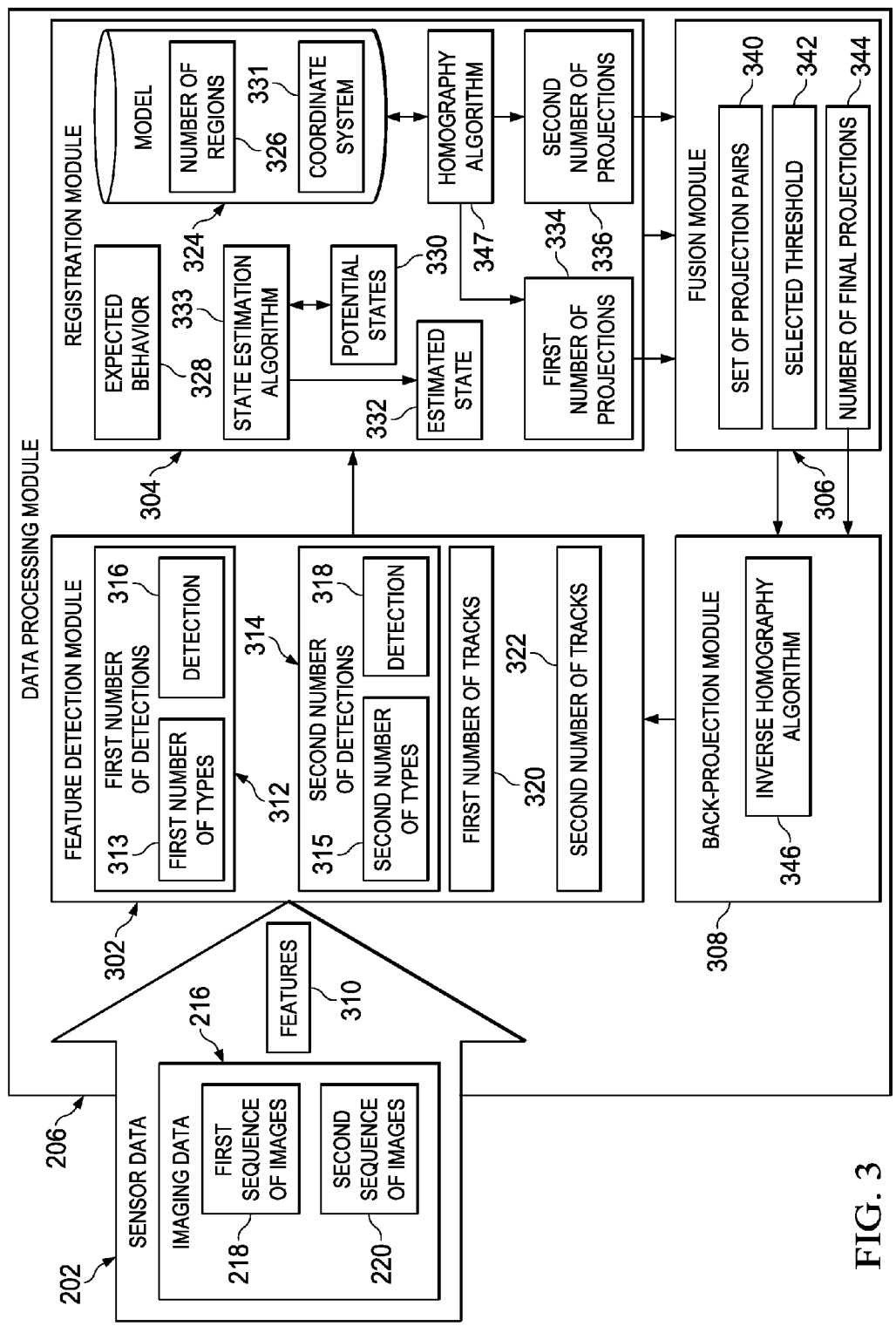
FIG. 3 is an illustration of a data processing module in accordance with an illustrative embodiment.

With reference now to FIG. 3, an illustration of data processing module 206 from FIG. 2 is depicted in accordance with an illustrative embodiment. Data processing module 206 may include feature detection module 302, registration module 304, fusion module 306, and back-projection module 308.

Feature detection module 302 receives sensor data 202 from number of sensor systems 204 in FIG. 2 for processing. Feature detection module 302 processes sensor data 202 to detect features 310 in sensor data 202. When sensor data 202 is imaging data 216, features 310 detected in image data 216 may include at least a portion of objects 223 in scene 222 from FIG. 2. As used herein, "at least a portion" means one, some, or all.

In one illustrative example, feature detection module 302 makes first number of detections 312 of objects 223 in scene 222 from FIG. 2 using first sequence of images 218 and second number of detections 314 of objects 223 using second sequence of images 220. First number of detections 312 and/or second number of detections 314 may include detections of one, some, or all of objects 223 in scene 222 from FIG. 2.

Further, one or more of first number of detections 312 may be for the same object in objects 223 as one or more of second number of detections 314. For example, both detection 316 from first sequence of images 218 and detection 318 from second sequence of images 220 may be detections of object 225 in objects 223 in scene 222 from FIG. 2. Of course, in other illustrative examples, detection 316 and detection 318 may be detections of different objects in objects 223.

Additionally, feature detection module 302 also groups first number of detections 312 and second number of detections 314 by type. For example, first number of detections 312 may include detections of first number of types 313. Second number of detections 314 may include detections of second number of types 315. A type in first number of types 313 and/or second number of types 315 may be selected from, for example, without limitation, one of a pedestrian type, a vehicle type, a structure type, or some other suitable type. In one illustrative example, detections of pedestrians are grouped together and detections of vehicles may be grouped together.

In these illustrative examples, feature detection module 302 also may be configured to generate first number of tracks 320 using first sequence of images 218 and second number of tracks 322 using second sequence of images 220. First number of tracks 320 may be generated to track one or more of objects 223 in scene 222 from FIG. 2 over time in first sequence of images 218. Second number of tracks 322 may be generated to track one or more of objects 223 in scene 222 over time in second sequence of images 220.

In one illustrative example, a track in first number of tracks 320 may be generated for object 225 when detection 316 of object 225 has been made in at least a selected number of images in first sequence of images 218. In some cases, the track may be generated when detection 316 of object 225 has been made for at least a selected period of time.

Feature detection module 302 sends first number of detections 312 and second number of detections 314 to registration module 304. In these illustrative examples, registration module 304 is configured to use first number of detections 312 to register viewpoint 227 of first imaging system 212 from FIG. 2 to model 324. Further, registration module 304 is configured to use second number of detections 314 to register viewpoint 229 of second imaging system 214 from FIG. 2 to model 324.

Registering a viewpoint, such as viewpoint 227 or viewpoint 229, to model 324 means transforming a coordinate system for the viewpoint to coordinate system 331 for model 324. This transformation may include, for example, rotating, translating, and/or performing some other operation to align the coordinate system for the viewpoint with coordinate system 331 for model 324.

In these illustrative examples, model 324 is a common model for number of sensor systems 204 from FIG. 2. Model 324 may take the form of, for example, a two-dimensional model, a three-dimensional model, or some other suitable type of model for scene 222 in FIG. 2. In some illustrative examples, model 324 may take the form of a two-dimensional map of scene 222. In this manner, coordinate system 331 may take the form of a two-dimensional coordinate system, a three-dimensional coordinate system, a geographic coordinate system, a Cartesian coordinate system, a polar coordinate system, and/or some other suitable type of coordinate system.

In one illustrative example, registration module 304 registers viewpoint 227 of first imaging system 212 to model 324 using detection 316 of object 225 and number of regions 326 in model 324 in which expected behavior 328 of object 225 is expected to occur. For example, when object 225 is a vehicle, expected behavior 328 of object 225 may include at least one of traveling on a road, being parked in a parking lot, turning at an intersection, changing lanes in a road, and some other suitable type of behavior.

These types of behaviors may be expected of object 225 and/or any object of the vehicle type. In this manner, when object 225 is a vehicle, number of regions 326 in model 324 may include, for example, any roads, intersections, parking lots, and/or other regions in model 324 in which expected behavior 328 of object 225 is expected to occur. In these illustrative examples, a region in number of regions 326 may be a continuous region, a discontinuous region, or some other suitable type of region.

Registration module 304 uses detection 316 of object 225 and number of regions 326 in model 324 in which expected behavior 328 of object 225 is expected to occur to identify potential states 330 of first imaging system 212 with respect to model 324. In these illustrative examples, a potential state in potential states 330 comprises at least one of a position and an orientation of first imaging system 212 with respect to coordinate system 331 for model 324.

Registration module 304 uses state estimation algorithm 333 to identify potential states 330 based on detection 316. State estimation algorithm 333 may take the form of, for example, a particle filter. In particular, the particle filter may take the form of, for example, a contextual estimation filter (CEF). This contextual estimation filter may also be referred to as a condensation algorithm. With state estimation algorithm 333, registration module 304 may be able to reduce the number of potential states 330 identified and generate estimated state 332 for first imaging system 212 when first number of detections 312 includes more than one detection.

Registration module 304 uses estimated state 332 for first imaging system 212 to register viewpoint 227 of first imaging system 212 to model 324. In these illustrative examples, registration module 304 registers viewpoint 229 of second imaging system 214 to model 324 in a manner similar to the manner in which viewpoint 227 of first imaging system 212 is registered to model 324.

Additionally, registration module 304 projects first number of detections 312 onto model 324 after viewpoint 227 of first imaging system 212 has been registered to model 324 to form first number of projections 334. Registration module 304 also projects second number of detections 314 onto model 324 after viewpoint 229 of second imaging system 214 has been registered to model 324 to form second number of projections 336.

These projections may be performed using, for example, homography algorithm 347. Homography algorithm 347 allows viewpoint 227 and viewpoint 229 to be transformed into coordinate system 331 for model 324. In other words, homography algorithm 347 is used to align viewpoint 227 and/or viewpoint 229 to coordinate system 331 for model 324 when these viewpoints are projected onto model 324.

Fusion module 306 is configured to perform sensor fusion by combining first number of projections 334 and second number of projections 336 in model 324. As one illustrative example, images in first sequence of images 218 and images in second sequence of images 220 may correspond to each other. For example, an image in first sequence of images 218 may have been generated at substantially the same time as an image in second sequence of images 220. These two images may be referred to as corresponding images. Feature detection module 302 may make first number of detections 312 and second number of detections 314 in these two corresponding images.

In this illustrative example, fusion module 306 identifies set of projection pairs 340 using first number of projections 334 and second number of projections 336 in model 324 for first number of detections 312 and second number of detections 314, respectively. In particular, each projection pair in set of projection pairs 340 includes a projection from first number of projections 334 and a projection from second number of projections 336 having a closest distance between each other in model 324.

In other words, set of projection pairs 340 includes the pairs of projections from each of first number of projections 334 and second number of projections 336 being closest to each other. As used herein, a "set of items" means zero or more items. For example, a set may be an empty or null set. In other words, in some cases, fusion module 306 may not identify any projection pairs.

For each projection pair identified in set of projection pairs 340, fusion module 306 determines whether the distance between the two projections in model 324 is less than selected threshold 342. If the distance between the two projections is not less than selected threshold 342, fusion module 306 determines that these two projections are for detections of different objects in objects 223 in scene 222 from FIG. 2. These two projections are considered final projections for the two different objects.

However, if the distance between the two projections is less than selected threshold 342, fusion module 306 determines that these projections are for detections of the same object in objects 223 in scene 222 from FIG. 2. Thereafter, fusion module 306 averages these two projections to form a final projection for the particular object in model 324. This averaging may be performed by, for example, identifying a centroid of the two projections in model 324.

In this manner, fusion module 306 combines first number of projections 334 and second number of projections 336 in model 324 to generate number of final projections 344 in model 324. Final number of projections 344 in model 324 may then be used by back-projection module 308 to back-project number of final projections 344 into sensor data 202 as detections generated by feature detection module 302. Final number of projections 344 are back-projected into the current images being processed by feature detection module 302.

In particular, back-projection module 308 uses inverse homography algorithm 346 to back-project number of final projections 344 into at least one of first sequence of images 218 and second sequence of images 220. Inverse homography algorithm 346 may be, for example, the inverse of homography algorithm 347 used by registration module 304. Inverse homography algorithm 346 allows number of final projections 344 to be transformed to the coordinate system for viewpoint 227 and/or viewpoint 229.

These back-projections of number of final projections 344 into at least one of first sequence of images 218 and second sequence of images 220 may be used by feature detection module 302. In particular, feature detection module 302 may use these back-projections to improve the detection of features 310 in first sequence of images 218 and second sequence of images 220 over time.

In one illustrative example, a final projection in number of final projections 344 for an object in objects 223 is formed based on a detection of the object in the current image from first sequence of images 218 being processed by feature detection module 302. In other words, no detections for that object are made in the current image from second sequence of images 220 being processed by feature detection module 302.

However, this final projection may be back-projected into the next image in first sequence of images 218 and the next image in second sequence of images 220 processed by feature detection module 302. In this manner, the detection of features 310 by feature detection module 302 in these next images may be improved.

The illustrations of data processing system 200 in FIG. 2 and data processing module 206 in FIG. 2 and FIG. 3 are not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

Figure 4:
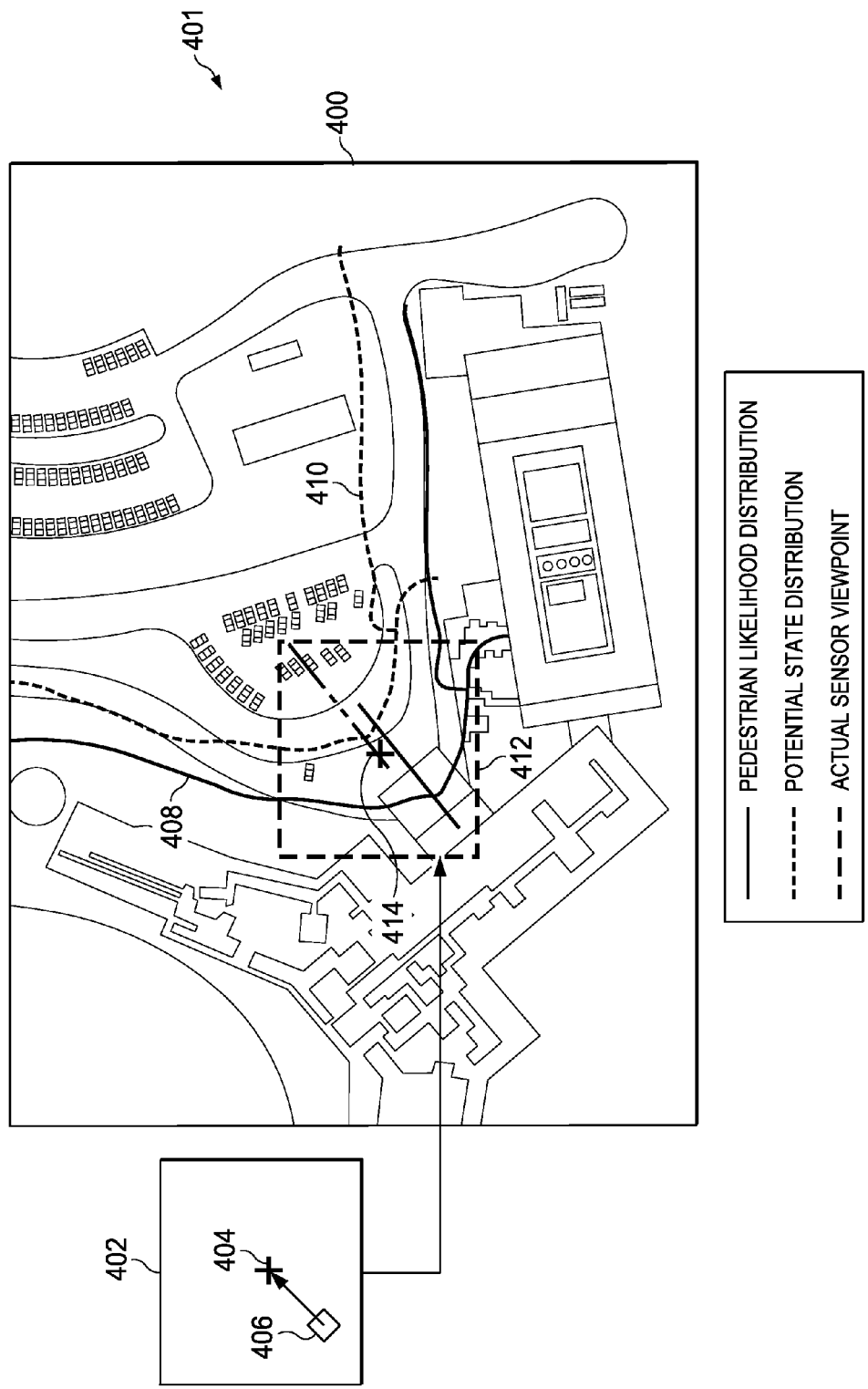
FIG. 4 is an illustration of a map in accordance with an illustrative embodiment.

With reference now to FIG. 4, an illustration of a map is depicted in accordance with an illustrative embodiment. In this illustrative example, map 400 is an example of one implementation for model 324 in FIG. 3. In particular, map 400 is a two-dimensional map of scene 401.

Viewpoint 402 of imaging system 404 is an example of one implementation of, for example, viewpoint 227 of first imaging system 212 and viewpoint 229 of second imaging system 214 in FIG. 2. In one illustrative example, imaging system 404 may be a camera on an unmanned aerial vehicle located above scene 401. Viewpoint 402 is the viewpoint of that camera looking down at scene 401.

Location 406 is the location with respect to viewpoint 402 of imaging system 404 at which a pedestrian in scene 401 has been detected. This detection may have been made using, for example, feature detection module 302 from FIG. 3.

Pedestrian likelihood distribution 408 indicates the region in map 400 in which an expected behavior of a pedestrian is expected to occur. For example, a pedestrian may be expected to walk along sidewalks in scene 401. In this manner, pedestrian likelihood distribution 408 indicates the region in map 400 in which the pedestrian detected at location 406 with respect to viewpoint 402 is expected to be located in scene 401.

Registration module 304 in FIG. 3 may be configured to use location 406 and pedestrian likelihood distribution 408 to identify potential state distribution 410 for the imaging system. More specifically, potential state distribution 410 indicates the potential states for imaging system 404 based on location 406 and pedestrian likelihood distribution 408. In this illustrative example, a potential state comprises a position for imaging system 404 above scene 401 with respect to the coordinate system of map 400. In this manner, potential state distribution 410 indicates the region in map 400 in which imaging system 404 may be located.

In this illustrative example, window 412 on map 400 indicates the actual location of viewpoint 402 with respect to scene 401 in map 400. In other words, window 412 outlines the portion of scene 401 corresponding to the actual viewpoint of imaging system 404. Further, position 414 is the actual position of imaging system 404 over scene 401.

Figure 5:
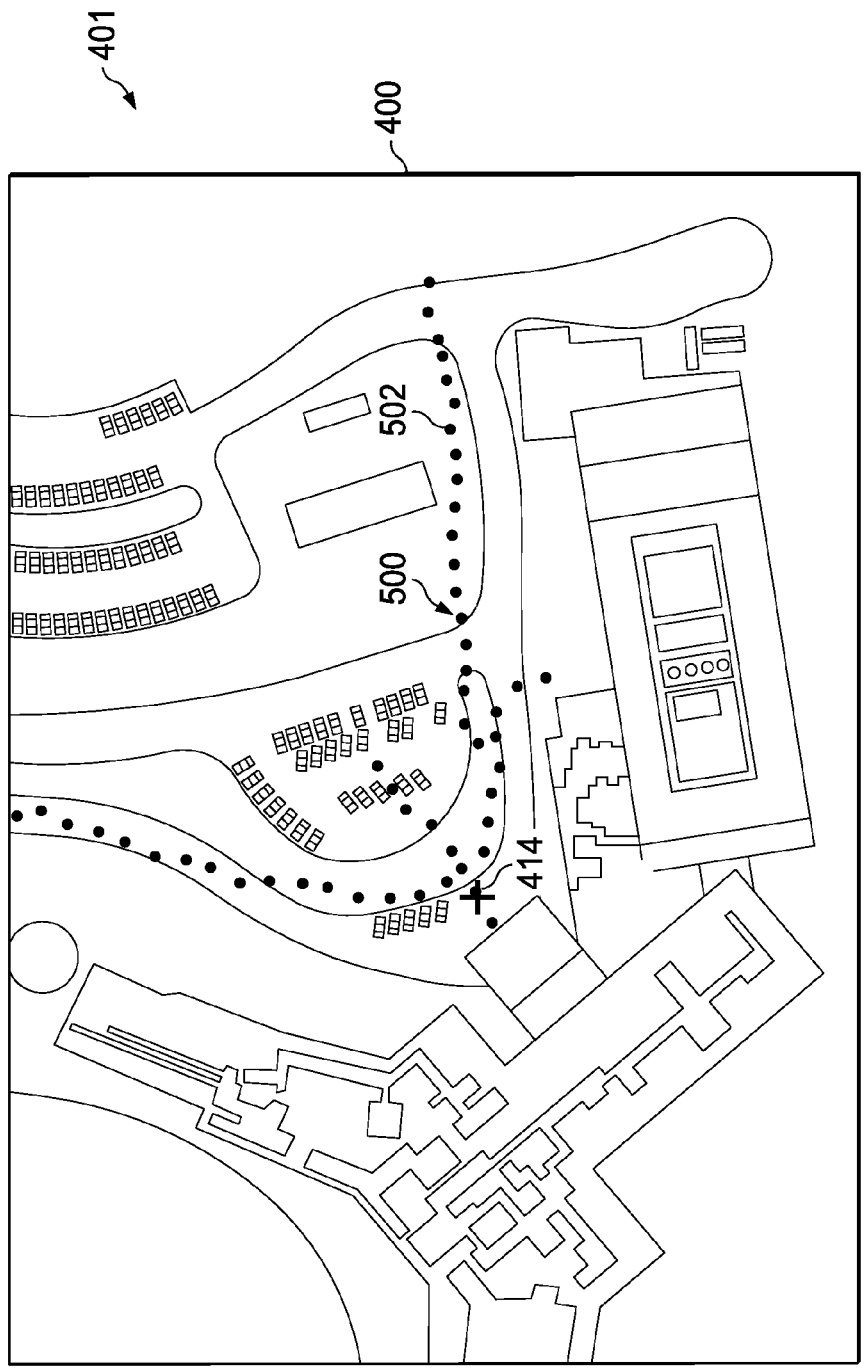
FIG. 5 is an illustration of the estimated state distribution for an imaging system in accordance with an illustrative embodiment.

With reference now to FIG. 5, an illustration of the estimated state distribution for an imaging system is depicted in accordance with an illustrative embodiment. In this illustrative example, estimated states 500 indicate the estimated possible positions of imaging system 404 over scene 401 from FIG. 4 consistent with location 406 at which the pedestrian is detected with respect to viewpoint 402, pedestrian likelihood distribution 408, and potential state distribution 410 from FIG. 4.

Estimated state 502 is an example of one of estimated states 500 that approximate the possible positions of imaging system 404. Estimated state 502 comprises a position over scene 401 at which imaging system 404 may be located based on location 406 at which the pedestrian was detected with respect to viewpoint 402 of imaging system 404. In this illustrative example, estimated states 500 are generated using state estimation algorithm 333 in registration module 304 in FIG. 3. More specifically, estimated states 500 are generated using state estimation algorithm 333 in the form of a condensation algorithm.

Figure 6:
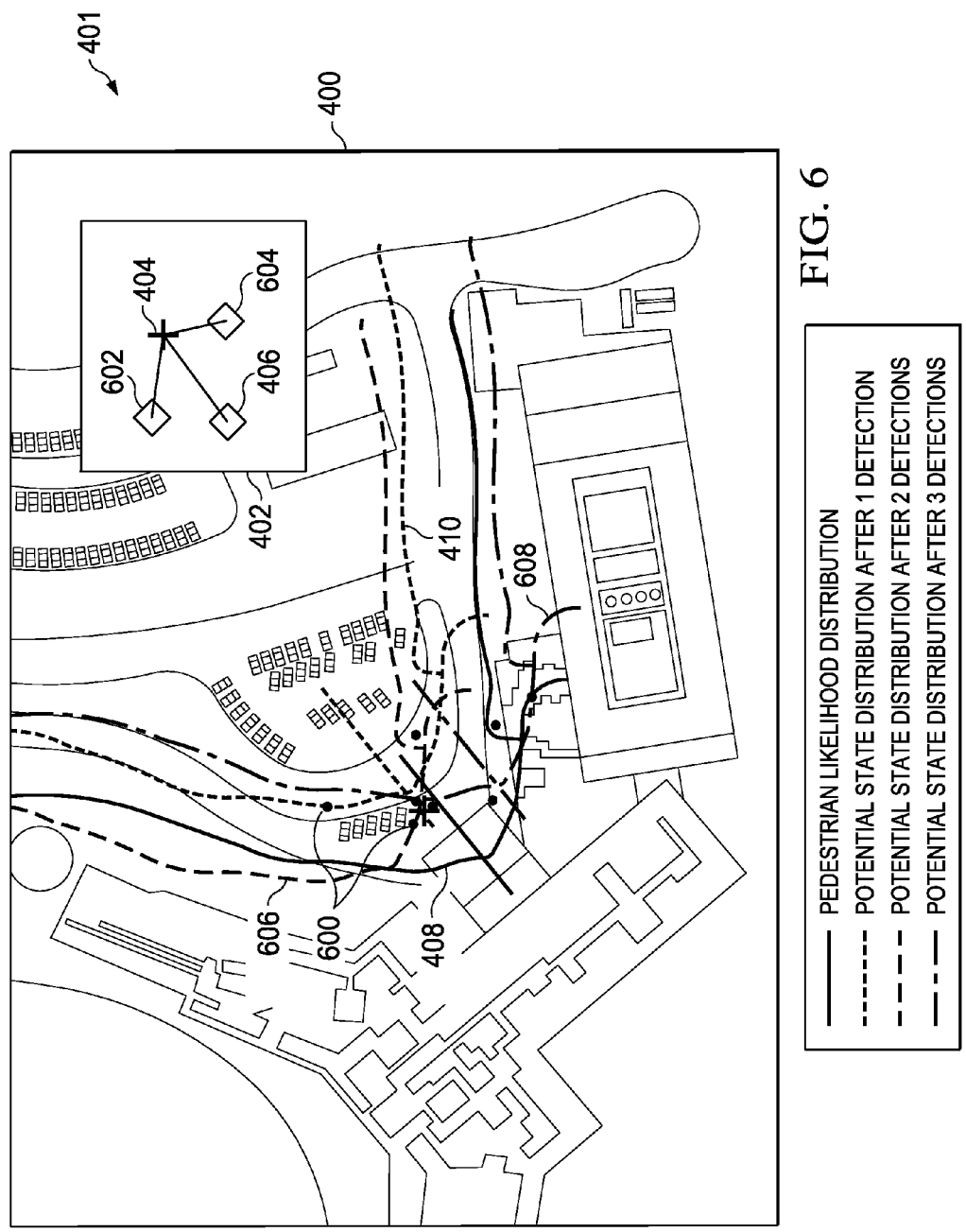
FIG. 6 is an illustration of the estimated state distribution for an imaging system in accordance with an illustrative embodiment.

With reference now to FIG. 6, an illustration of the estimated state distribution for an imaging system is depicted in accordance with an illustrative embodiment. In this illustrative example, estimated states 600 indicate the estimated possible positions for imaging system 404 when more than one pedestrian is detected in scene 401. The pedestrian detected at location 406 with respect to viewpoint 402 is a first pedestrian detected. A second pedestrian may be detected at location 602 with respect to viewpoint 402, and a third pedestrian may be detected at location 604 with respect to viewpoint 402.

When both the first pedestrian and the second pedestrian are detected, the total potential state distribution is the sum of potential state distribution 410 and potential state distribution 606. Further, when the first pedestrian, the second pedestrian, and the third pedestrian are detected, the total potential state distribution is the sum of potential state distributions 410, 606, and 608.

In this manner, as the number of detections of pedestrians in scene 401 increases, the total potential state distribution for imaging system 404 changes. In particular, as the number of detections of pedestrians in scene 401 increases and the distributions are summed, the densities for estimated states 600 change. The estimated state corresponding to the most likely state of imaging system 404 is the state with the maximum density in the total potential state distribution.

Further, uncertainty in the most likely state identified for imaging system 404 decreases as the number of detections of pedestrians in scene 401 increases. As depicted, estimated states 600 include a smaller region of uncertainty as compared to estimated states 500 in FIG. 5.

Figure 7:
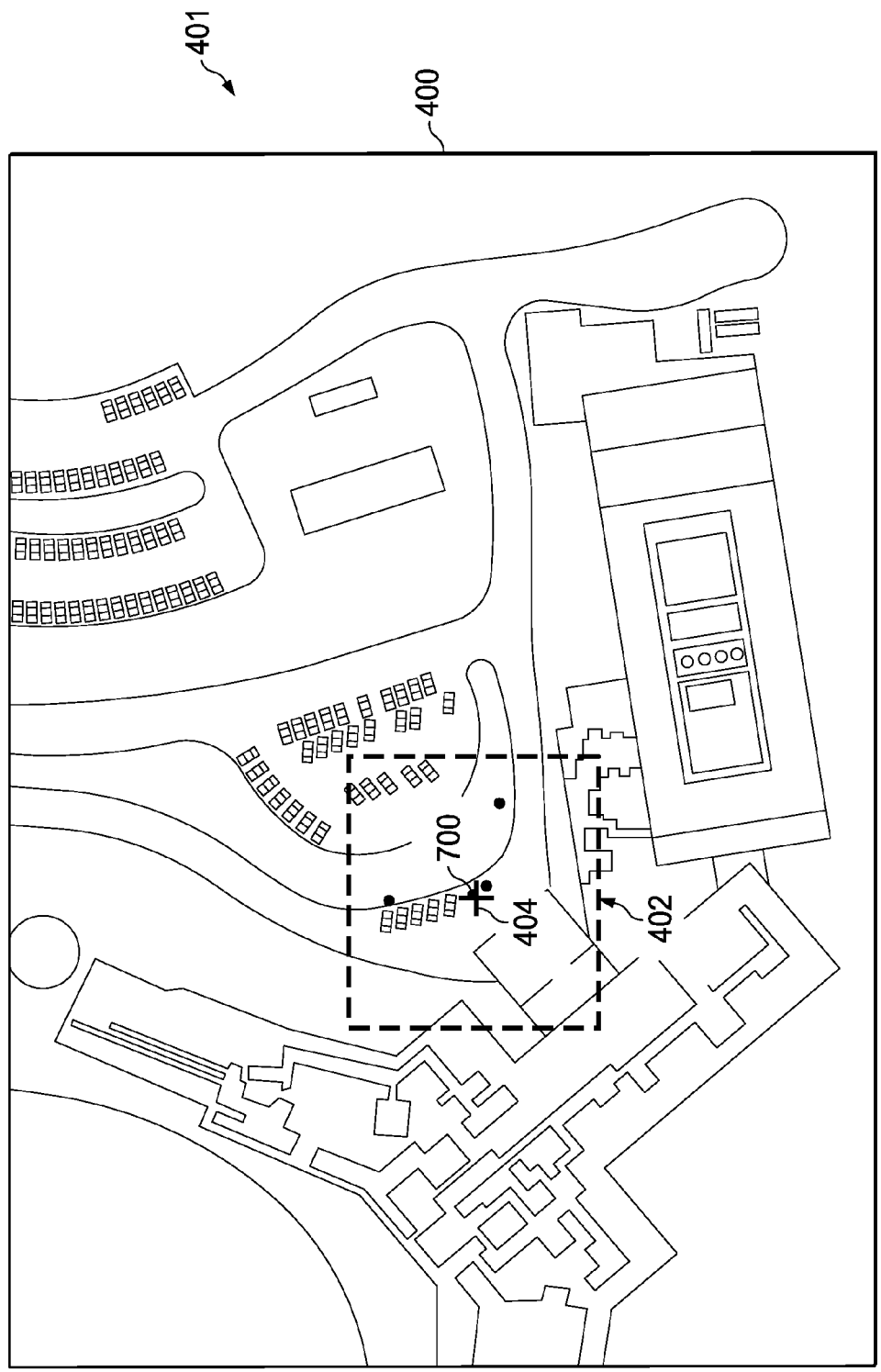
FIG. 7 is an illustration of a registration of a viewpoint of an imaging system to a map and the final state distribution in accordance with an illustrative embodiment.

With reference now to FIG. 7, an illustration of a registration of a viewpoint of an imaging system to a map and the final state distribution is depicted in accordance with an illustrative embodiment. In this illustrative example, viewpoint 402 of imaging system 404 has been registered to map 400 of scene 401 using locations 406, 602, and 604 of pedestrian detections with respect to viewpoint 402 from FIG. 6 and potential state distribution 608 from FIG. 6. As depicted, viewpoint 402 is registered using estimated state 700 for imaging system 404.

Estimated state 700 is selected based on the highest density in estimated states 600. In our invention, the total potential state distribution is determined by the sum of the potential state distributions due to multiple behavior detections. States which are consistent with the most number of behavior detections have the highest density. In this illustrative example, the state corresponding to the highest density is selected as estimated state 700 for imaging system 404.

Figure 8:
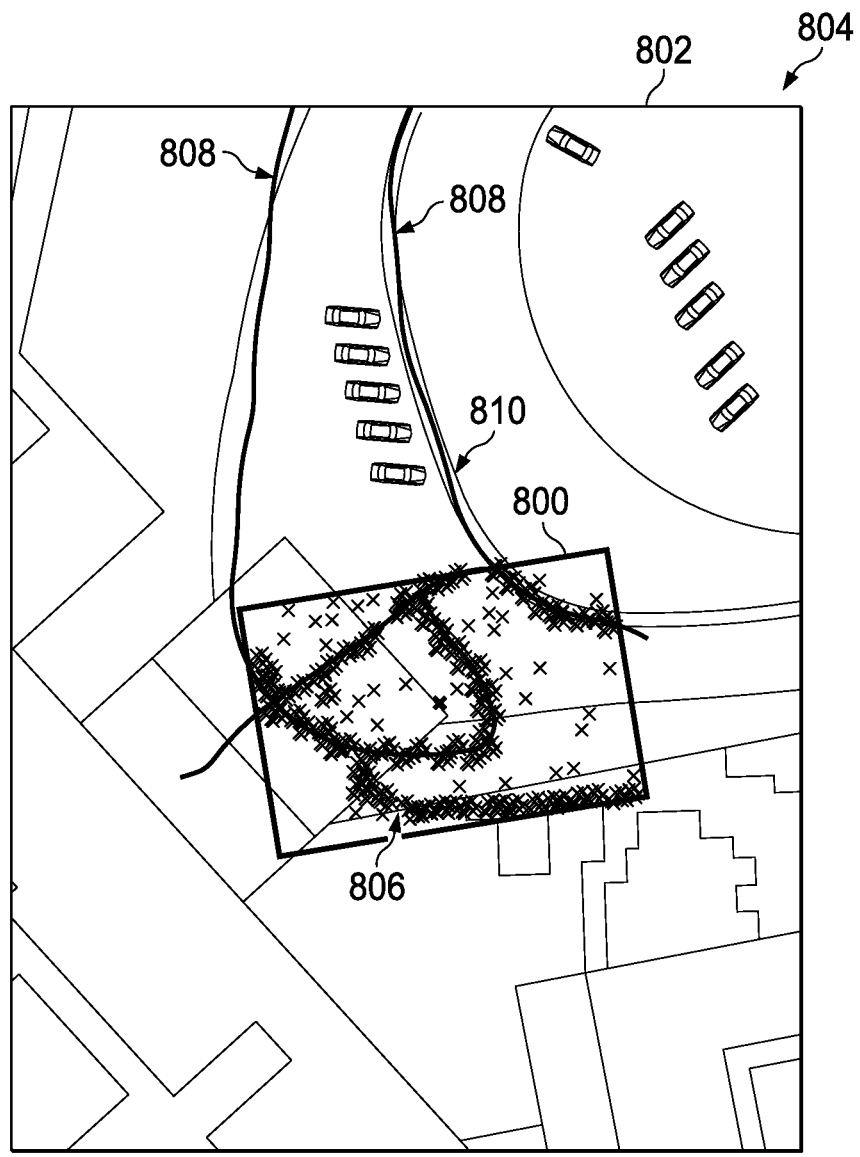
FIG. 8 is an illustration of a registration of viewpoint of an imaging system to a map in accordance with an illustrative embodiment.

With reference now to FIG. 8, an illustration of a registration of a viewpoint of an imaging system to a map is depicted in accordance with an illustrative embodiment. In this illustrative example, viewpoint 800 for an imaging system, such as, for example, first imaging system 212 or second imaging system 214 in FIG. 2, has been registered to map 802 of scene 804.

In particular, viewpoint 800 is registered to map 802 based on detections 806. In this depicted example, detections 806 are the detections of pedestrians in scene 804 with respect to viewpoint 800 of the imaging system. As illustrated, pedestrian likelihood distribution 808 indicates the region in map 802 in which an expected behavior of a pedestrian is expected to occur. Pedestrian likelihood distribution 808 indicates that pedestrians are expected to walk along sidewalks 810 in scene 804.

Registration module 304 in FIG. 3 may use pedestrian likelihood distribution 808 and detections 806 in viewpoint 800 of the imaging system to register viewpoint 800 to map 802. As depicted, when viewpoint 800 is registered to map 802, detections 806 may lie along pedestrian likelihood distribution 808. As the number of detections 806 made increases, the accuracy with which viewpoint 800 may be registered to map 802 also increases.

Figure 9:
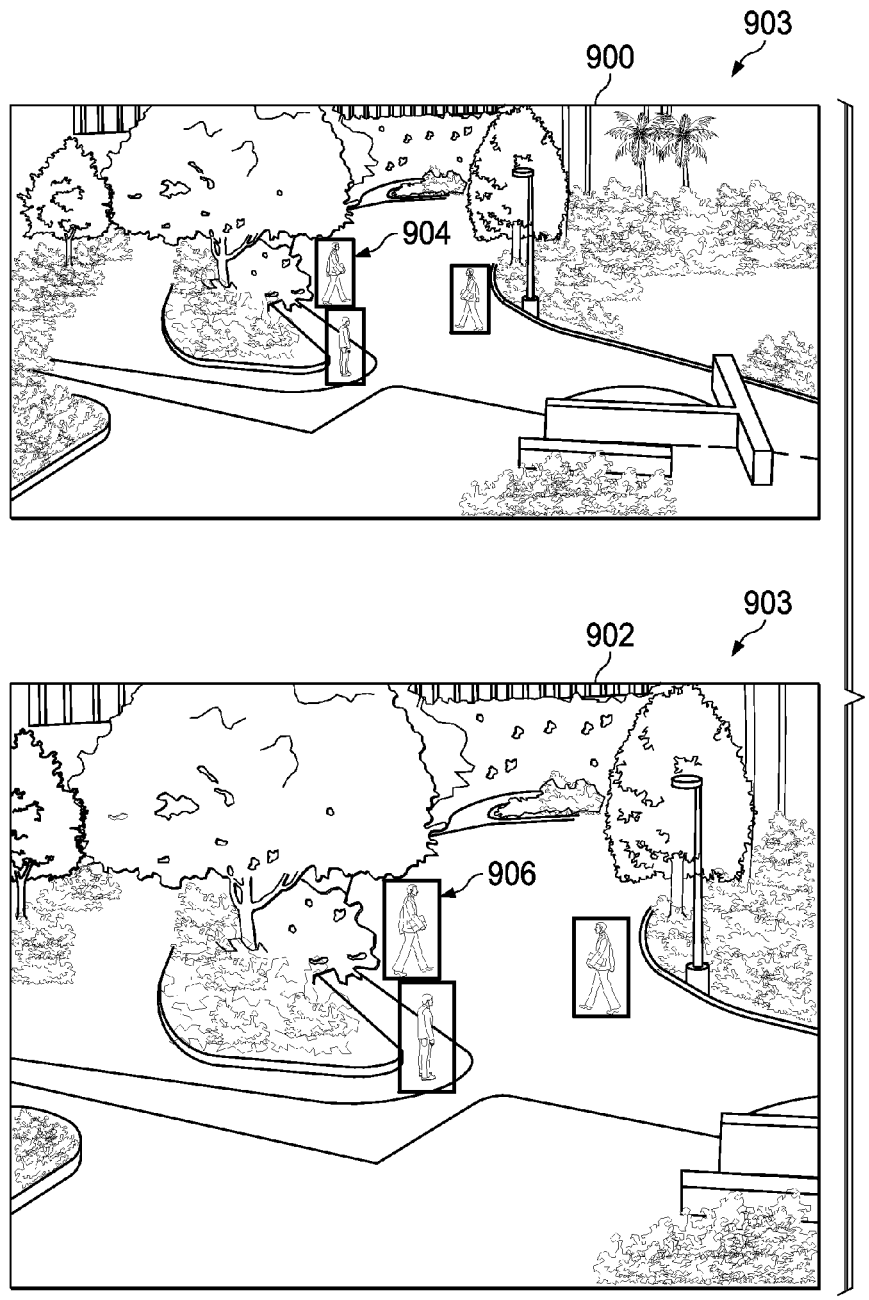
FIG. 9 is an illustration of imaging data generated by two different types of imaging systems in accordance with an illustrative embodiment.
Figure 10:
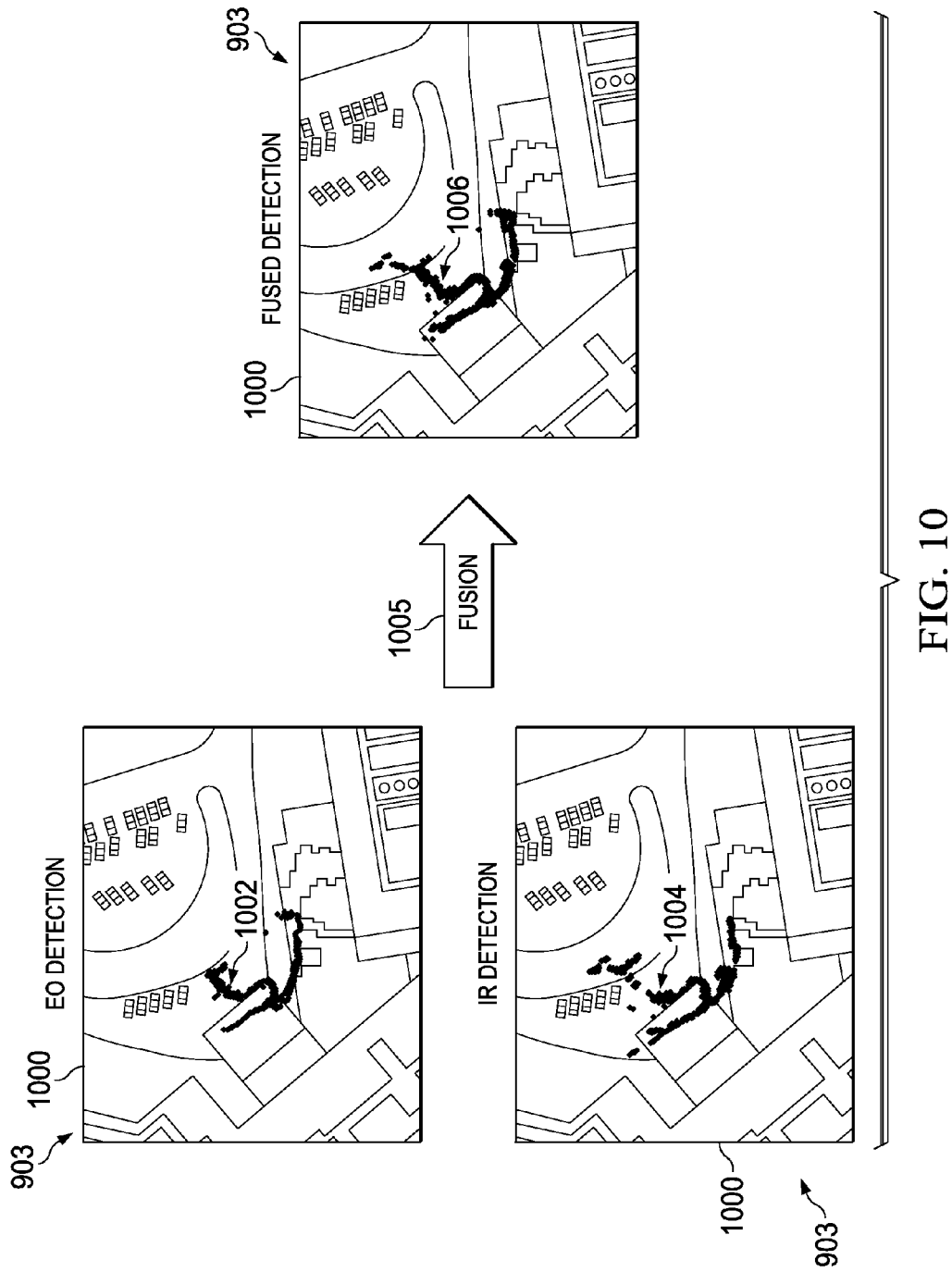
FIG. 10 is an illustration of sensor fusion in accordance with an illustrative embodiment.
Figure 11:
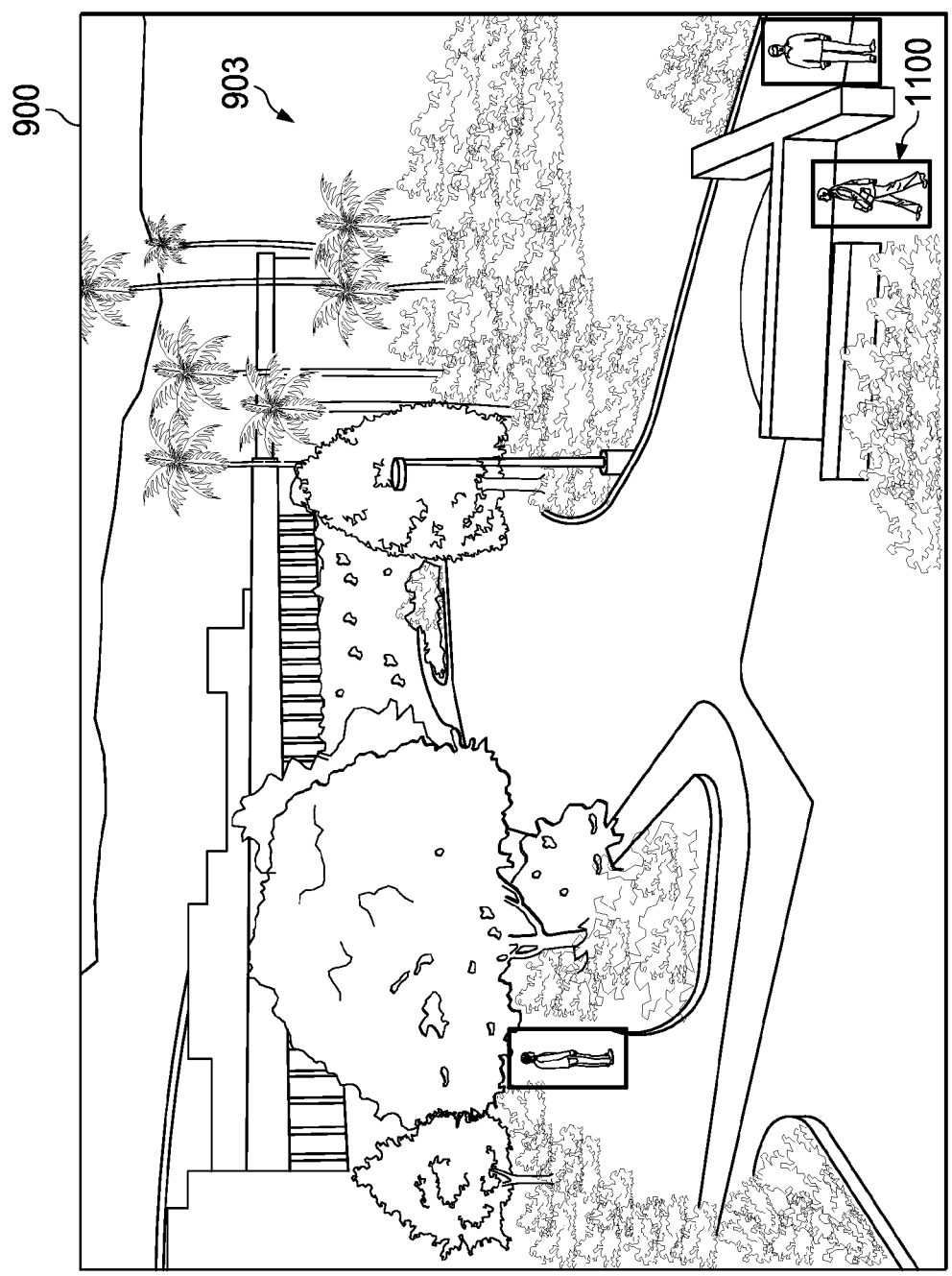
FIG. 11 is an illustration of back-projection of tracks onto video in accordance with an illustrative embodiment.

With reference now to FIGS. 9-11, illustrations of the processing of imaging data are depicted in accordance with an illustrative embodiment. In FIGS. 9-11, imaging data generated by two different types of imaging systems is processed and used to generate more accurate data as compared to using the imaging data generated by one imaging system.

Turning now to FIG. 9, an illustration of imaging data generated by two different types of imaging systems is depicted in accordance with an illustrative embodiment. In this illustrative example, first video 900 is generated by an electro-optical imaging system. Second video 902 is generated by an infrared imaging system. Both first video 900 and second video 902 are generated for the same scene.

Each of first video 900 and second video 902 comprises a sequence of images. Each of first video 900 and second video 902 are received at a data processing module, such as data processing module 206 in FIG. 3, as a continuous stream of images. First video 900 and second video 902 are processed by data processing module 206 as first video 900 and second video 902 are being received.

For example, feature detection module 302 in FIG. 3 generates first tracks 904 using first video 900 and second tracks 906 using second video 902. First tracks 904 and second tracks 906 are generated for pedestrians detected in scene 903 by feature detection module 302.

With reference now to FIG. 10, an illustration of sensor fusion is depicted in accordance with an illustrative embodiment. In this illustrative example, registration module 304 in FIG. 3 has registered a viewpoint of the electro-optical imaging system that generated first video 900 in FIG. 9 to map 1000. Map 1000 is an example one implementation for model 324 in FIG. 3. Further, registration module 304 has also registered a viewpoint of the infrared imaging system that generates second video 902 in FIG. 9 to map 1000.

Based on the registrations of these two viewpoints to map 1000, registration module 304 projects first tracks 904 in FIG. 9 onto map 1000 to form first projections 1002. Further, registration module 304 projects second tracks 906 in FIG. 9 onto map 1000 to form second projections 1004. In this illustrative example, at least a portion of second projections 1004 and at least a portion of first projections 1002 are for the same pedestrians in scene 903. Further, in some cases, one or more pedestrians represented by first projections 1002 may not be represented by any of second projections 1004. Similarly, one or more pedestrians represented by second projections 1004 may not be represented by any of first projections 1002.

Fusion module 306 in FIG. 3 is configured to perform sensor fusion 1005 to form final projections 1006. When sensor fusion 1005 is performed, each of final projections 1006 may represent a different pedestrian in scene 903. Sensor fusion 1005 is performed such that pedestrians in scene 903 may be tracked more accurately using both first video 900 and second video 902 in FIG. 9 as compared to using only one of first video 900 and second video 902.

With reference now to FIG. 11, an illustration of back-projection of tracks onto video is depicted in accordance with an illustrative embodiment. In this illustrative example, final projections 1006 from FIG. 10 have been back-projected onto first video 900 generated by the electro-optical imaging system.

In particular, final projections 1006 are back-projected onto first video 900 at a later point in time for first video 900 as compared to when first tracks 904 in FIG. 9 were generated. In other words, final projections are back-projected onto images in first video 900 generated at a later point in time than the images of first video 900 depicted in FIG. 9.

Feature detection module 302 in FIG. 3 uses these back-projections to generate tracks 1100 for pedestrians in scene 903. Tracks 1100 may be more accurate tracks for pedestrians in scene 903 as compared to first tracks 904 generated in FIG. 9. Further, tracks 1100 may be used by registration module 304 in FIG. 3 to more accurately register the viewpoint of the electro-optical imaging system to map 1000 in FIG. 10. In this manner, tracks 1100 may be more accurately projected onto map 1000 as sensor fusion 1005 is performed for the new images received in first video 900.

The illustrations of the processing of imaging data in FIGS. 9-11 are not meant to imply limitations to the manner in which an illustrative embodiment may be implemented. For example, in other illustrative examples, other types of video may also be used. For example, sensor fusion 1005 may be performed using video generated by a radar imaging system in addition to first video 900 and second video 902 in FIG. 9.

Figure 12:
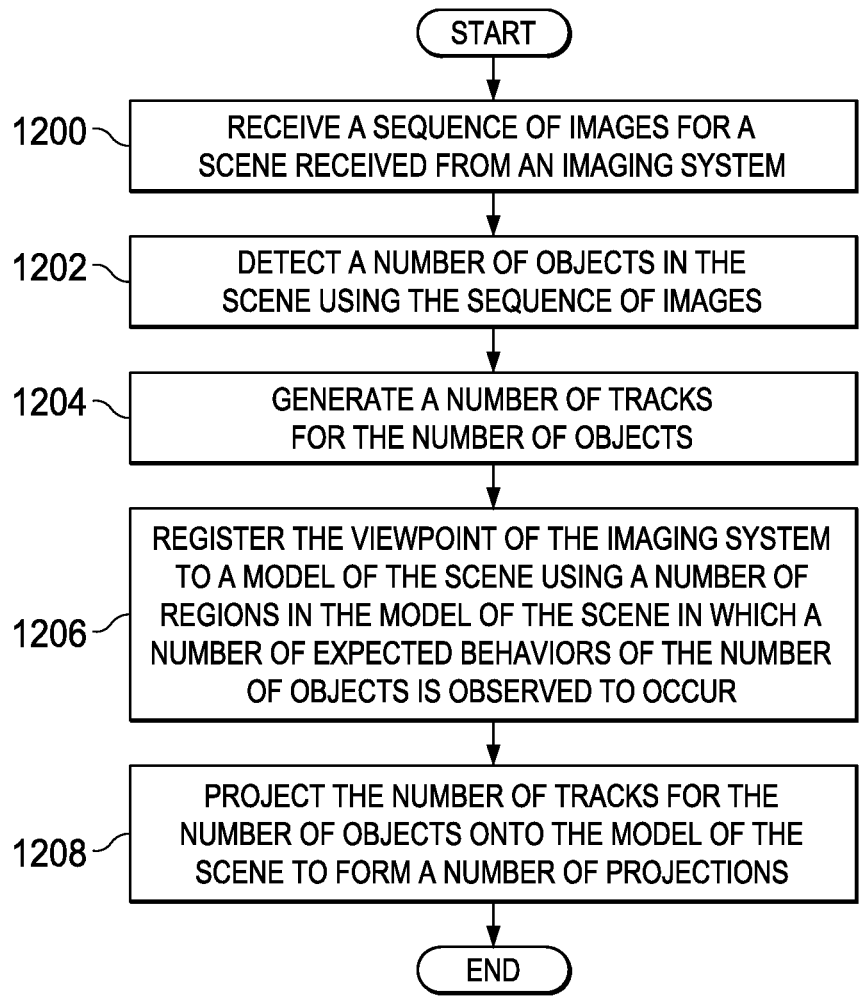
FIG. 12 is an illustration of a flowchart of a process for processing images in accordance with an illustrative embodiment.

With reference now to FIG. 12, an illustration of a flowchart of a process for processing images is depicted in accordance with an illustrative embodiment. The process illustrated in FIG. 12 may be implemented using data processing module 206 in FIGS. 2 and 3. In particular, this process may be implemented using feature detection module 302 and registration module 304 in FIG. 3.

The process begins by receiving a sequence of images for a scene received from an imaging system (operation 1200). In operation 1200, this sequence of images may take the form of video. The viewpoint of the imaging system from which the sequence of images is generated may change. For example, the imaging system may be a video camera mounted to the bottom of an aircraft. As the aircraft flies over the scene, the viewpoint of the imaging system changes.

The process then detects a number of objects in the scene using the sequence of images (operation 1202). For example, the number of objects may include pedestrians, vehicles, and/or other suitable types of objects. The process generates a number of tracks for the number of objects (operation 1204). In operation 1204, these tracks may track the movement of the number of objects in the scene over time in the sequence of images.

Thereafter, the process registers the viewpoint of the imaging system to a model of the scene using a number of regions in the model of the scene in which a number of expected behaviors of the number of objects is observed to occur (operation 1206). In operation 1206, the model may be, for example, a two-dimensional map of the scene for which the sequence of images was generated. The number of objects detected may be, for example, vehicles. Vehicles are expected to travel on roads. The tracks generated for the vehicles, as well as any roads on the map of the scene, may be used to register the viewpoint of the imaging system to the map of the scene. In these illustrative examples, operation 1206 may be performed using state estimation algorithm 333 in FIG. 3.

Next, the process projects the number of tracks for the number of objects onto the model of the scene to form a number of projections (operation 1208), with the process terminating thereafter. In particular, operation 1208 is performed based on the registration of the viewpoint of the imaging system to the model in operation 1206.

Figure 13:
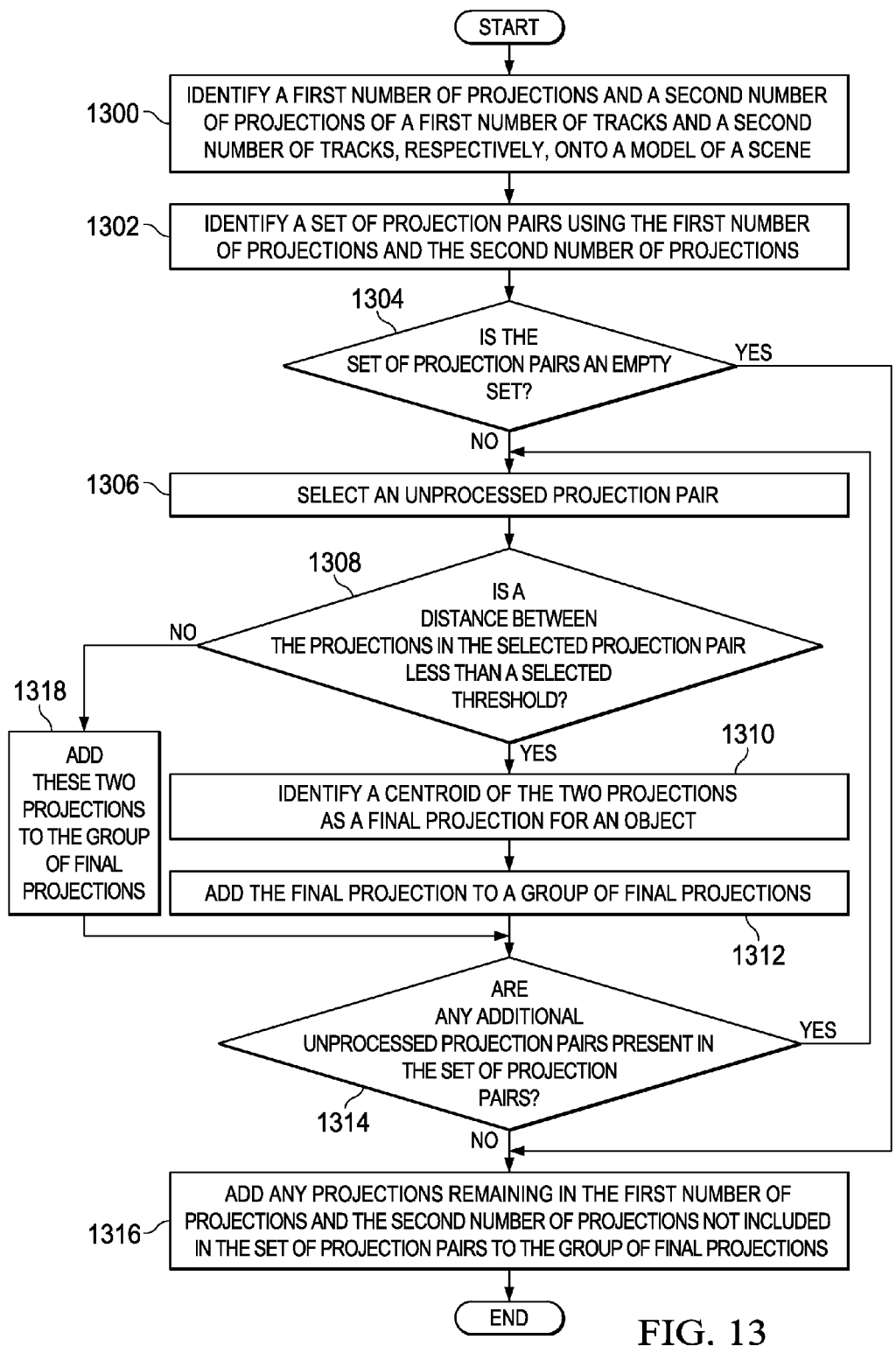
FIG. 13 is an illustration of a flowchart of a process for performing sensor fusion in accordance with an illustrative embodiment.

With reference now to FIG. 13, an illustration of a flowchart of a process for performing sensor fusion is depicted in accordance with an illustrative embodiment. The process illustrated in FIG. 13 may be implemented using data processing module 206 in FIG. 2 and FIG. 3. In particular, this process may be implemented using fusion module 306 in FIG. 3.

The process begins by identifying a first number of projections and a second number of projections of a first number of tracks and a second number of tracks, respectively, onto a model of a scene (operation 1300). The first number of projections and the second number of projections may have been formed using the process illustrated in FIG. 12.

In particular, the first number of projections may have been formed by projecting a first number of tracks generated using imaging data for the scene from a first type of imaging system onto the model of the scene. The second number of projections may have been formed by projecting a second number of tracks generated using imaging data for the scene from a second type of imaging system onto the model of the scene. The process illustrated in FIG. 12 may be used to process the imaging data received from the first type of imaging system and the imaging data from the second type of imaging system.

The process then identifies a set of projection pairs using the first number of projections and the second number of projections (operation 1302). Each projection pair in the set of projection pairs include a projection from the first number of projections and a projection from the second number of projections that are closest to each other with respect to a coordinate system for the model.

In some cases, the set of projection pairs may be an empty set. For example, if at least one projection from the first number of projections is not within a selected distance from a projection in the second number of projections, the set of projection pairs may be an empty set.

Next, the process determines whether the set of projection pairs is an empty set (operation 1304). If the set is not an empty set, the process selects an unprocessed projection pair (operation 1306). Thereafter, the process determines whether a distance between the projections in the selected projection pair is less than a selected threshold (operation 1308). When the distance between the projections in the selected projection pair is less than the selected threshold, the two projections may be considered to be projections for the same object. In other words, the projections may be for tracks of the same object.

In operation 1308, if the distance between the projections in the selected projection pair is less than a selected threshold, the process identifies a centroid of the two projections as a final projection for an object (operation 1310). Next, the process adds the final projection to a group of final projections (operation 1312).

The process then determines whether any additional unprocessed projection pairs are present in the set of projection pairs (operation 1314). If additional unprocessed projection pairs are present in the set of projection pairs, the process returns to operation 1306 as described above. Otherwise, if additional unprocessed projection pairs are not present in the set of projection pairs, the process adds any projections remaining in the first number of projections and the second number of projections not included in the set of projection pairs to the group of final projections (operation 1316), with the process terminating thereafter.

With reference again to operation 1308, if the distance between the projections in the selected projection pair is not less than the selected threshold, the process adds these two projections to the group of final projections (operation 1318). The process then proceeds to operation 1314 as described above. Further, with reference again to operation 1304, if the set of projection pairs is an empty set, the process proceeds to operation 1316 as described above.

In this illustrative example, the group of final projections is the result of sensor fusion of the imaging data generated by the first type of imaging system and the imaging data generated by the second type of imaging system. The group of final projections may more accurately track the objects in the scene as compared to the first number of projections or the second number of projections.

Figure 14:
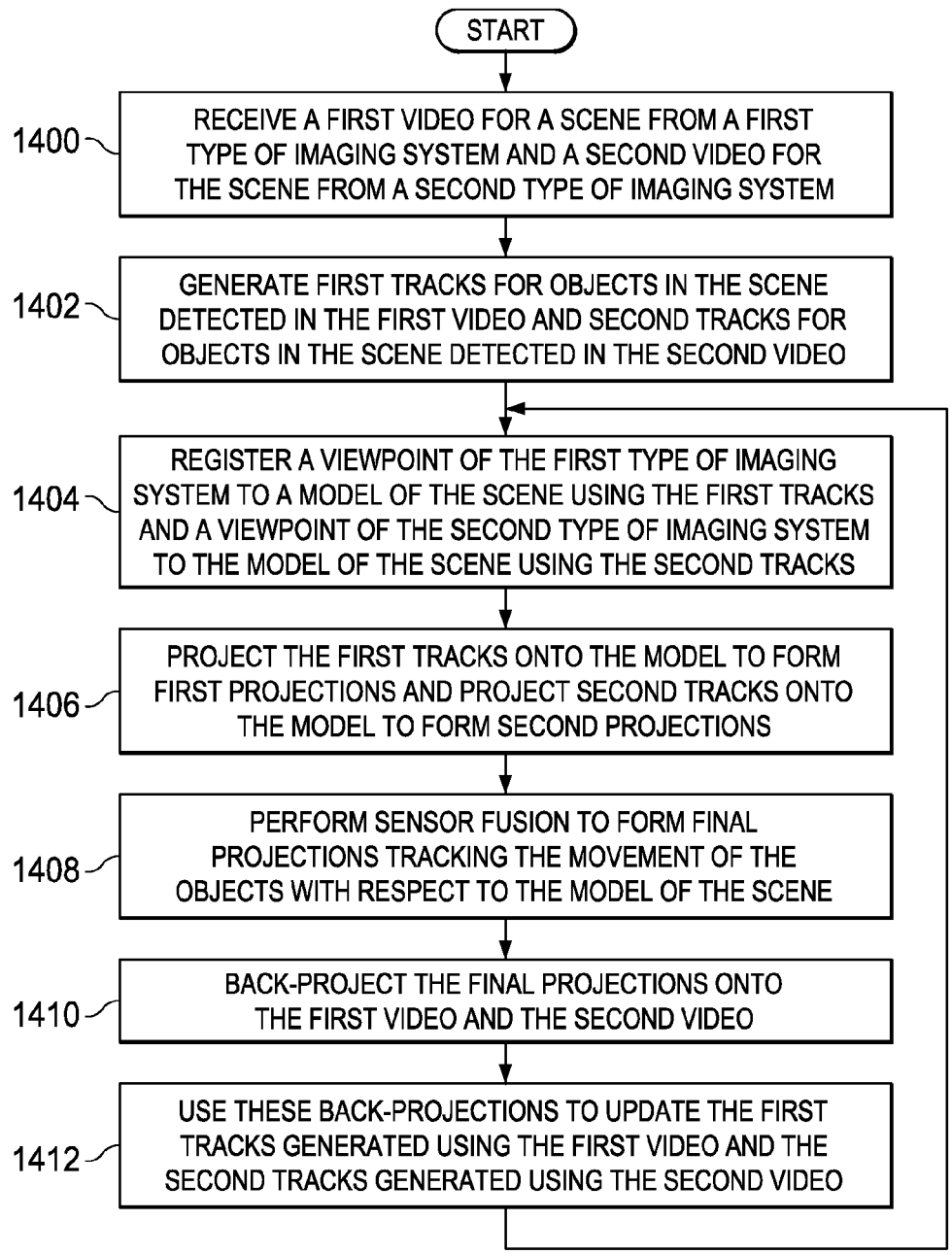
FIG. 14 is an illustration of a flowchart of a process for using sensor fusion to improve tracking the movement of objects in a scene in accordance with an illustrative embodiment.

With reference now to FIG. 14, an illustration of a flowchart of a process for using sensor fusion to improve tracking the movement of objects in a scene is depicted in accordance with an illustrative embodiment. The process illustrated in FIG. 14 may be implemented using, for example, data processing module 206 in FIG. 2 and FIG. 3. In particular, this process may be implemented using feature detection module 302, registration module 304, fusion module 306, and back-projection module 308 in FIG. 3.

The process begins by receiving a first video for a scene from a first type of imaging system and a second video for the scene from a second type of imaging system (operation 1400). In operation 1400, the first video and the second video for the scene are received in substantially real-time in this illustrative example.

The process generates first tracks for objects in the scene detected in the first video and second tracks for objects in the scene detected in the second video (operation 1402). The first tracks and the second tracks may be for the same and/or different objects in the scene. Next, the process registers a viewpoint of the first type of imaging system to a model of the scene using the first tracks and a viewpoint of the second type of imaging system to the model of the scene using the second tracks (operation 1404). This registration may be performed using the process illustrated in FIG. 12. In particular, operation 1404 may be performed using operation 1206 in FIG. 12.

The process then projects the first tracks onto the model to form first projections and project second tracks onto the model to form second projections (operation 1406). These projections track the movement of the objects in the scene with respect to the model of the scene.

Thereafter, the process performs sensor fusion to form final projections tracking the movement of the objects with respect to the model of the scene (operation 1408). Operation 1408 may be performed using the process described in FIG. 13. The process then back-projects the final projections onto the first video and the second video (operation 1410).

The process uses these back-projections to update the first tracks generated using the first video and the second tracks generated using the second video (operation 1412). In operation 1412, updating the first tracks and the second tracks may include updating a position of the tracks with respect to the first video and the second video, adding additional tracks, removing tracks, and/or performing other suitable operations.

In these illustrative examples, the process then returns to operation 1404 using the updated first tracks and the updated second tracks to register the viewpoints of the imaging systems to the models.

In this manner, the sensor fusion may be used to improve the accuracy with which objects in the scene are tracked in the first video and the second video for the scene. Further, the final projections formed by the sensor fusion may be used to improve the registration of the viewpoints of the imaging systems to the model of the scene.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In these different illustrative embodiments, one method for implementing state estimation algorithm 333 from FIG. 3 may be in the form of a condensation algorithm, otherwise known as a particle filter. This condensation algorithm is used to identify the state of an imaging system, such as first imaging system 212 or second imaging system 214 in FIG. 2. The state space, $X^t$, for registration of an imaging system may be defined using position and orientation of the imaging system at a given point in time, t.

The relationship between the state of the imaging system and the observation of the state of the imaging system may be simplified as follows:

$$Z^t = f(X^t) = X^t + n^t \tag{1}$$

where $Z^t$ is the observation of the state of the imaging system at time, t, and $n^t$ is the noise at time, t.

The condensation algorithm is based on factored sampling but is extended to apply iteratively to successive images in a sequence. At each time-step, the process is a self-contained iteration of factored sampling. The output of an iteration will be a weighted, time-stamped sample set, denoted $\{s_t^{(n)}, n=1 \ldots N\}$, with weights $\pi_t^{(n)}$, representing approximately the conditional t at time, t, where the sample set is the set of particles, n is an index, and N is the total number of samples or particles.

In particular, the condensation algorithm updates a set of particles, $\{s_{t-1}^{(n)}, n=1 \ldots N\}$, and their weights, $\{s_t^{(n)}, n=1 \ldots N\}$, from which the posterior mean of the state of the imaging system may be computed. The posterior mean is an estimate of the state of the imaging system given the set of observation and may be computed as follows:

$$\hat{x}_t = E[x|z] = \sum_{n=1}^{N} \pi_t^{(n)} s_t^{(n)} \tag{2}$$

where $\hat{x}_t$ is the posterior mean of the state at time, t; and $E[x|z]$ is the estimate of the state, x, of the imaging system given the observation, z.

The condensation algorithm is an iterative process. From the "old" sample set, $\{s_{t-1}^{(n)}, \pi_{t-1}^{(n)}, c_{t-1}^{(n)}, n=1, \ldots, N\}$, at time t−1, a "new" sample set, $\{s_t^{(n)}, \pi_t^{(n)}, c_t^{(n)}\}$, n=1, ..., N, is constructed for time, t. In this illustrative example, $c_t^{(n)}$ are the cumulative weights.

The $n^{th}$ of N new samples are constructed by first selecting a sample, $s_t^{r(n)}$. The sample is selected as follows:

1) generating a random number r∈[0,1], uniformly distributed;
2) finding, by binary subdivision, the smallest j for which $c_{t-1}^{(j)} \geq r$; and
3) setting $s_t^{r(n)} = s_{t-1}^{(j)}$.

Then, predictions are made by sampling from $p(x_t|x_{t-1} = s_t^{r(n)})$ to choose each $s_t^{(n)}$. The new position in terms of the observations, $z_t$, is measured and weighted as follows in terms of a modified data likelihood function:

$$\pi_t^{(n)} = p(z_t | x_t = s_t^{(n)}), \text{ where,} \quad (3)$$

$$P(z|x) = P_a(z|x) P_b(z|x) \quad (4)$$

$$P_a(z|x) \propto \exp(\|z - x\|^2_{\Sigma^{-1}}), \text{ and} \quad (5)$$

$$P_{b,s}(z|x) = \begin{cases} \alpha & \text{if } x \in O \\ 1-a & \text{if } x \notin O, \end{cases} \quad (6)$$

where the set O is the set of points in the scene in which, according to a priori geospatial data, expected behaviors and expected detections of objects is most likely to occur. For example, if vehicles are being detected, the set O may include the points in the scene that correspond to roads. In this illustrative example, the constant, α, may be set to a value between about 0.5 and about 1.

In this example, P(z|x) is the data likelihood function that describes the probability of an observation, z, being made given the current state, x, and incorporates the expected behaviors of objects with respect to the scene. This function is also referred to as a data likelihood density or data likelihood density function. The data likelihood function is categorized into two functions, also referred to as densities.

The first function, expressed in equation (5) is a function of the distance from the current state capturing the noise of the imaging system. In other words, the first function takes into account noise of the imaging system. The second function, expressed in equation (6), determines whether a detection of the object in the scene is at a location in the region in the model of the scene in which an expected behavior of the object is expected to occur. In other words, the second function determines whether the observation is located in a high likelihood geospatial region.

Next, the results are normalized such that:

$$\Sigma_n \pi_t^{(n)} = 1 \quad (7)$$

The results are stored with cumulative probability as $(s_t^{(n)}, \pi_t^{(n)}, c_t^{(n)})$, where $$c_t^{(0)} = 0, \text{ and} \quad (8)$$

$$c_t^{(n)} = c_t^{(n-1)} + \pi_t^{(n)} (n=1, \ldots, N). \quad (9)$$

Once the N samples have been constructed, moments of the tracked position at time, t, may be estimated as follows:

$$\epsilon[f(x_t)] = \Sigma_{n=1}^N \pi_t^{(n)} f(s_t^{(n)}), \quad (10)$$

such that a mean position may be obtained using f(x)=x. In this manner, the condensation algorithm takes into account the probability of an observation, z, being made given the current state, x, to estimate the state of the imaging system.

Turning now to FIG. 15, an illustration of a data processing system is depicted in accordance with an illustrative embodiment. In this illustrative example, data processing system 1500 may be used to implement one or more computers in computer system 226 in FIG. 2. Data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508.

Computer readable storage media 1524 also may take the form of a persistent storage, such as a hard drive, a thumb drive, or a flash memory, that is connected to data processing system 1500. In some instances, computer readable storage media 1524 may not be removable from data processing system 1500. In these examples, computer readable storage media 1524 is a physical or tangible storage device used to store program code 1518 rather than a medium that propagates or transmits program code 1518. Computer readable storage media 1524 is also referred to as a computer readable tangible storage device or a computer readable physical storage device. In other words, computer readable storage media 1524 is a media that can be touched by a person.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1518 may be omitted, because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1506, or a cache, such as found in an interface and memory controller hub that may be present in communications fabric 1502.

Thus, the different illustrative embodiments provide a method and apparatus for processing images. In one illustrative embodiment, a sequence of images for a scene is received from an imaging system. An object is detected in the scene using the sequence of images. A viewpoint of the imaging system is registered to a model of the scene using a region in the model of the scene in which an expected behavior of the object is expected to occur.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, the method comprising:
   receiving a sequence of images for a scene from an imaging system;
   detecting an object in the scene using the sequence of images, forming a detection; and
   registering a viewpoint of the imaging system to a model of the scene using the detection of the object in the scene and a region in the model of the scene in which an expected behavior of the object is expected to occur, forming a registration, wherein the registering the viewpoint of the imaging system to the model of the scene comprises determining whether the detection of the object in the scene is at a location in the region in the model of the scene in which the expected behavior of the object is expected to occur.

2. The method of claim 1, wherein registering the viewpoint of the imaging system to the model of the scene using the detection of the object in the scene and the region in the model of the scene in which the expected behavior of the object is expected to occur comprises:
   estimating a state of the imaging system based on a probability of the state of the imaging system given an identification of the object detected in the scene using the sequence of images of the scene and involved in forming the detection used in the registering the viewpoint of the imaging system to the model of the scene.

3. The method of claim 2, wherein estimating the state of the imaging system based on the probability of the state of the imaging system given the identification of the object in the sequence of images of the scene comprises:
   estimating the state of the imaging system using a condensation algorithm comprising a first function and a second function, wherein the first function takes into account noise of the imaging system and the second function determines whether the detection of the object in the scene is at the location in the region in the model of the scene in which the expected behavior of the object is expected to occur, and wherein the first function and the second function form a data likelihood function.

4. The method of claim 2, further comprising:
   tracking a movement of the object in the scene over time using the sequence of images, forming a track, wherein the track is generated when the detection of the object used in the registering the viewpoint of the imaging system to the model of the scene has been made for at least a selected period of time; and
   wherein the registering the viewpoint of the imaging system to the model of the scene uses the detection of the object in the scene, the track of the movement of the object generated when the detection of the object has been made for at least the selected period of time, and the region in the model of the scene in which the expected behavior of the object is expected to occur.

5. The method of claim 4, further comprising:
   identifying the object involved in the detection used in the registering the viewpoint of the imaging system to the model of the scene and the track used in the registering the viewpoint of the imaging system to the model of the scene, forming the identification;
   wherein the object involved in the detection of the object in the scene, the track of the movement of the object, and the region in the model of the scene in which the expected behavior of the object is expected to occur all used in the registering the viewpoint of the imaging system to the model of the scene comprises at least one of a vehicle and a pedestrian;
   wherein determining whether the detection of the object in the scene is at the location in the region in the model of the scene in which the expected behavior of the object is expected to occur comprises at least one of:
      determining whether the detection of the vehicle in the scene is at the location in the region in the model of the scene in which the vehicle is expected to at least one of travel on a road, be parked in a parking lot, turn at an intersection, and change lanes in the road; and
      determining whether the detection of the pedestrian in the scene is at the location in the region in the model of the scene in which the pedestrian is expected to walk along sidewalks in the scene; and
   wherein the registering the viewpoint of the imaging system to the model of the scene uses the region in the model of the scene in which at least one of:
      the vehicle is expected to at least one of travel on the road, be parked in the parking lot, turn at the intersection, and change the lanes in the road; and
      the pedestrian is expected to walk along the sidewalks in the scene.

6. The method of claim 5, wherein the imaging system is a first imaging system, the sequence of images is a first sequence of images, the object is a first object, the viewpoint is a first viewpoint, the detection is a first detection, the registration is a first registration, the track is a first track, and the movement is a first movement, and further comprising:
   receiving a second sequence of images for the scene from a second imaging system;
   detecting a second object in the scene using the second sequence of images, forming a second detection, wherein the second object is a same type as the first object; and
   registering a second viewpoint of the second imaging system to the model of the scene using the second detection of the second object in the scene and the region in the scene in which the expected behavior for the second object is expected to occur, forming a second registration.

7. The method of claim 6 further comprising:
   projecting the first track for the first object onto the model of the scene to form a first projection based on the first registration of the first viewpoint of the first imaging system to the model of the scene; and
   projecting a second track for the first object onto the model of the scene to form a second projection based on the second registration of the second viewpoint of the second imaging system to the model of the scene.

8. The method of claim 7, wherein the first projection and the second projection form a projection pair and further comprising:
   determining whether a distance between the first projection and the second projection with respect to a coordinate system for the model is less than a selected threshold; and
   identifying a centroid of the first projection and the second projection as a final projection when the distance between the first projection and the second projection with respect to the coordinate system for the model is less than the selected threshold, wherein the final projection tracks the first movement of the first object with respect to the model of the scene.

9. The method of claim 8, wherein:
   the first imaging system and the second imaging system are different, and wherein the final projection is generated using multi-modal fusion by a fusion module in communication with the first imaging system and the second imaging system; and further comprising:

using the fusion to improve the tracking of the movement of the first object in the scene over time and of another movement of the second object in the scene over time.

10. The method of claim 9, wherein the first imaging system comprises an electro-optical imaging system and the second imaging system comprises an infrared imaging system.

11. The method of claim 9 further comprising:
back-projecting the final projection into at least one of the first sequence of images and the second sequence of images, wherein a back-projection is formed; and
using the back-projection to improve detection of a feature in the at least one of the first sequence of images and the second sequence of images, wherein improvement is relative to detection of the feature using only the first sequence of images or the second sequence of images.

12. The method of claim 9 further comprising:
back-projecting the final projection into at least one of the first sequence of images and the second sequence of images, wherein a back-projection is formed.

13. The method of claim 12, wherein back-projecting is performed using an inverse homography algorithm.

14. The method of claim 12 further comprising:
using the back-projection to improve detection of a feature in the at least one of the first sequence of images and the second sequence of images, wherein improvement is relative to detection of the feature using only the first sequence of images or the second sequence of images.

15. An apparatus comprising:
a computer system configured to receive a sequence of images for a scene from an imaging system; detect an object in the scene using the sequence of images, forming a detection; and register a viewpoint of the imaging system to a model of the scene using the detection of the object in the scene and a region in the model of the scene in which an expected behavior of the object is expected to occur, wherein in being configured to register the viewpoint of the imaging system to the model of the scene, the computer system is configured to determine whether the detection of the object in the scene is at a location in the region in the model of the scene in which the expected behavior of the object is expected to occur.

16. The apparatus of claim 15, wherein in being configured to register the viewpoint of the imaging system to the model of the scene using the detection of the object in the scene and the region in the model of the scene in which the expected behavior of the object is expected to occur, the computer system is configured to estimate a state of the imaging system based on a probability of the state of the imaging system given an identification of the object detected in the scene using the sequence of images of the scene and involved in forming the detection used in the registering the viewpoint of the imaging system to the model of the scene.

17. The apparatus of claim 16, wherein:
in being configured to estimate the state of the imaging system based on the probability of the state of the imaging system given the identification of the object in the sequence of images of the scene, the computer system is configured to estimate the state of the imaging system using a condensation algorithm comprising a first function and a second function, wherein the first function takes into account noise of the imaging system and the second function determines whether the detection of the object in the scene is at the location in the region in the model of the scene in which the expected behavior of the object is expected to occur, and wherein the first function and the second function form a data likelihood function.

18. The apparatus of claim 15, wherein:
the computer system is further configured to track a movement of the object in the scene over time using the sequence of images, forming a track;
the computer system is configured to generate the track when the detection of the object used to register the viewpoint of the imaging system to the model of the scene has been made for at least a selected period of time; and
wherein in being configured to register the viewpoint of the imaging system to the model of the scene, the computer is configured to use the detection of the object in the scene, the track of the movement of the object generated when the detection of the object has been made for at least the selected period of time, and the region in the model of the scene in which the expected behavior of the object is expected to occur.

19. The apparatus of claim 18, wherein the imaging system is a first imaging system, the sequence of images is a first sequence of images, the object is a first object, the viewpoint is a first viewpoint, and the detection is a first detection, and wherein the computer system is further configured to receive a second sequence of images for the scene from a second imaging system; and detect a second object in the scene using the second sequence of images, forming a second detection, wherein the second object is a same type as the first object; measure a first distance between the first object and the second object; identify the first object and the second object; and register a second viewpoint of the second imaging system to the model of the scene using the second detection and the region in the scene in which the expected behavior for the second object is expected to occur.

20. The apparatus of claim 19, wherein the computer system is further configured to project a first track for the first object onto the model of the scene to form a first projection based on a first registration of the first viewpoint of the first imaging system to the model of the scene; and project a second track for the first object onto the model of the scene to form a second projection based on a second registration of the second viewpoint of the second imaging system to the model of the scene, wherein the first projection and the second projection form a projection pair and wherein the computer system is configured to determine whether a second distance between the first projection and the second projection with respect to a coordinate system for the model is less than a selected threshold; and identify a centroid of the first projection and the second projection as a final projection when the distance between the first projection and the second projection with respect to the coordinate system for the model is less than the selected threshold, wherein the final projection tracks the movement of the first object with respect to the model of the scene.

* * * * *